US012636577B2

(12) United States Patent
Bak

(10) Patent No.: US 12,636,577 B2
(45) Date of Patent: May 26, 2026

(54) ELECTRONIC APPARATUS AND METHOD OF OPERATING THE SAME

(71) Applicant: SAMSUNG ELECTRONICS CO., LTD., Suwon-si (KR)

(72) Inventor: Bonggil Bak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 229 days.

(21) Appl. No.: 18/140,091

(22) Filed: Apr. 27, 2023

(65) Prior Publication Data

US 2024/0082705 A1 Mar. 14, 2024

Related U.S. Application Data

(63) Continuation of application No. PCT/KR2023/004679, filed on Apr. 6, 2023.

(30) Foreign Application Priority Data

Apr. 6, 2022 (KR) ........................ 10-2022-0043062

(51) Int. Cl.
*A63F 13/35* (2014.01)
*A63F 13/335* (2014.01)
(Continued)

(52) U.S. Cl.
CPC ............ *A63F 13/35* (2014.09); *A63F 13/335* (2014.09); *G06F 3/165* (2013.01); *G06T 7/11* (2017.01)

(58) Field of Classification Search
CPC ...... A63F 13/35; A63F 13/335; A63F 13/355; A63F 13/358; A63F 13/52; A63F 13/54;
(Continued)

(56) References Cited

U.S. PATENT DOCUMENTS 7,460,731 B2 12/2008 Senftner et al.
9,526,989 B2 * 12/2016 Oh .......................... A63F 13/77
(Continued)

FOREIGN PATENT DOCUMENTS

JP 4503676 B1 4/2010
JP 2012-134969 A 7/2012
(Continued)

OTHER PUBLICATIONS

European Office Action dated Jan. 27, 2025 for European Application No. 23785030.0.
(Continued)

*Primary Examiner* — Michael A Cuff
(74) *Attorney, Agent, or Firm* — STAAS & HALSEY LLP

(57) ABSTRACT

An electronic apparatus including a communication interface; a memory storing one or more instructions; and a processor configured to execute the instructions to control a display to display content received from a server through the communication interface, obtain a control signal corresponding to a user input for controlling the content displayed, transmit the obtained control signal to the server through the communication interface; obtain an image output control signal corresponding to the obtained control signal while transmitting the obtained control signal to the server, process the content displayed based on the obtained image output control signal, control the display to display the content that was processed based on the obtained image output control signal while awaiting content processed by the server based on the transmitted obtained control signal, receive the content processed by the server, and control the display to display the received content processed by the server.

17 Claims, 17 Drawing Sheets

(51) Int. Cl.
  *G06F 3/16* (2006.01)
  *G06T 7/11* (2017.01)

(58) Field of Classification Search
  CPC ...... G06F 3/165; G06F 3/04845; G06F 3/162;
    G06F 3/167; G06T 7/11; H04N 21/42227;
    H04N 21/440245; H04N 21/4728; H04N
    21/4781; H04N 21/4854; H04N 21/4852;
    H04N 21/6587
  USPC .......................................................... 463/40
  See application file for complete search history.

(56) References Cited

U.S. PATENT DOCUMENTS

| | | | |
|---|---|---|---|
| 10,021,162 | B2 | 7/2018 | Lee et al. |
| 10,166,471 | B2 * | 1/2019 | Vincent .................... A63F 13/42 |
| 10,486,066 | B2 * | 11/2019 | Perry .................... A63F 13/355 |
| 10,630,773 | B2 | 4/2020 | Holmes |
| 10,773,156 | B2 | 9/2020 | Colenbrander |
| 11,077,364 | B2 | 8/2021 | Zimring et al. |
| 11,865,450 | B2 | 1/2024 | Osman |
| 2009/0167961 | A1 | 7/2009 | Suzuki et al. |
| 2011/0267440 | A1 * | 11/2011 | Kim ......................... H04N 5/60 |
| | | | 348/E5.026 |
| 2012/0167151 | A1 | 6/2012 | Cho |
| 2012/0287071 | A1 * | 11/2012 | Wang .................... G06F 3/0486 |
| | | | 345/173 |
| 2014/0162625 | A1 | 6/2014 | Zhao et al. |
| 2016/0293134 | A1 * | 10/2016 | Fortin ................... A63F 13/355 |
| 2018/0091106 | A1 * | 3/2018 | Suyama ................. G08C 17/02 |
| 2019/0096179 | A1 | 3/2019 | Frenkel |
| 2021/0106912 | A1 | 4/2021 | Knowles et al. |
| 2021/0154583 | A1 | 5/2021 | Osman |
| 2021/0235112 | A1 | 7/2021 | Kopietz |
| 2021/0362051 | A1 | 11/2021 | Perry |
| 2022/0046356 | A1 * | 2/2022 | Barkai .................... H04B 3/04 |
| 2023/0089118 | A1 | 3/2023 | Qu et al. |

FOREIGN PATENT DOCUMENTS

| | | |
|---|---|---|
| KR | 10-2015-0134716 A | 12/2015 |
| KR | 10-2017-0099088 | 8/2017 |
| KR | 10-2003007 B1 | 7/2019 |
| KR | 10-2020-0127926 A | 11/2020 |
| KR | 10-2215360 B1 | 2/2021 |
| KR | 10-2021-0028376 A | 3/2021 |
| KR | 10-2021-0133642 | 11/2021 |
| KR | 10-2022-0028192 A | 3/2022 |
| WO | WO 2010/146417 A1 | 12/2010 |
| WO | WO 2021/183158 A1 | 9/2021 |
| WO | WO 2021/257838 A1 | 12/2021 |
| WO | WO 2022/037224 A1 | 2/2022 |

OTHER PUBLICATIONS

International Search Report dated Jul. 3, 2023 for International Application No. PCT/KR2023/004679.
Extended European Search Report dated May 13, 2025 for European Application No. 23785030.0.
Korean Office Action dated Jan. 19, 2026 for KR Patent Application No. 10-2022-0043062.

* cited by examiner

FIG. 5

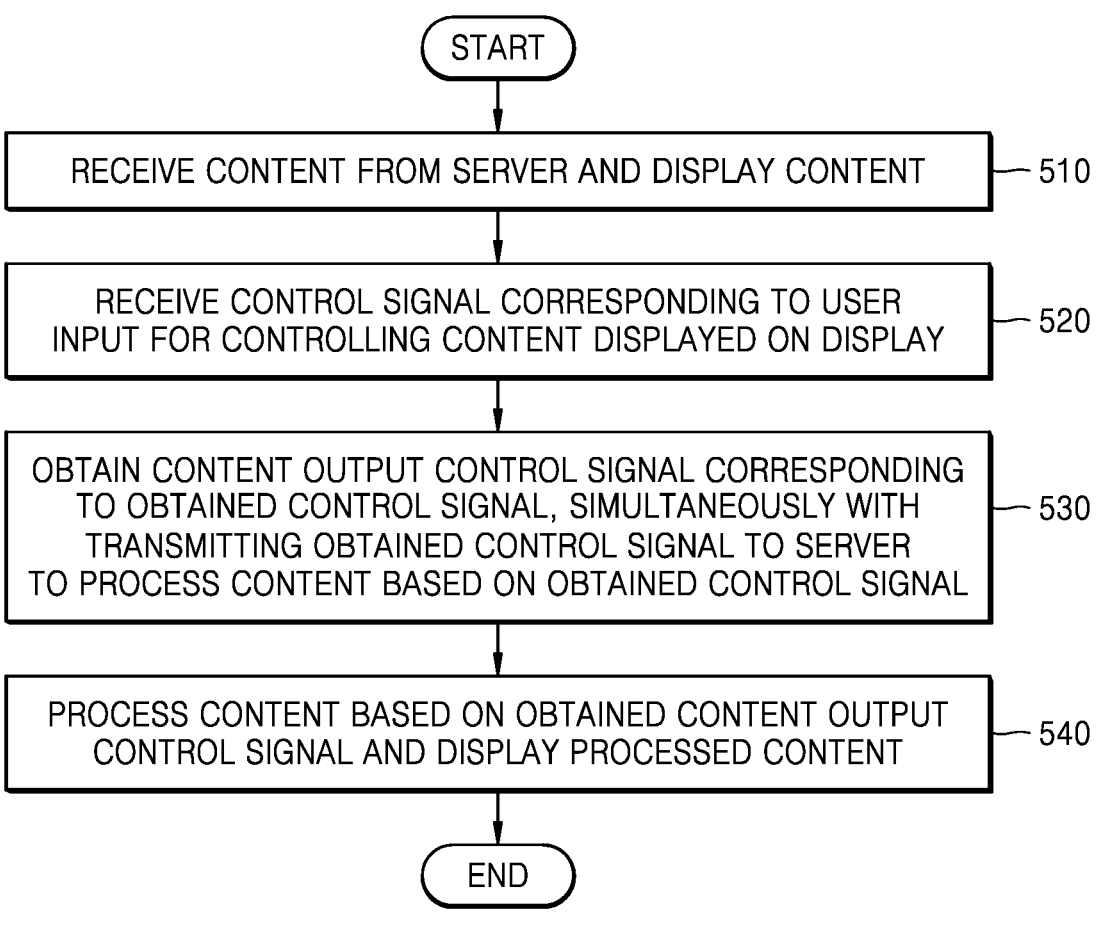

START

RECEIVE CONTENT FROM SERVER AND DISPLAY CONTENT — 510

RECEIVE CONTROL SIGNAL CORRESPONDING TO USER
INPUT FOR CONTROLLING CONTENT DISPLAYED ON DISPLAY — 520

OBTAIN CONTENT OUTPUT CONTROL SIGNAL CORRESPONDING
TO OBTAINED CONTROL SIGNAL, SIMULTANEOUSLY WITH
TRANSMITTING OBTAINED CONTROL SIGNAL TO SERVER
TO PROCESS CONTENT BASED ON OBTAINED CONTROL SIGNAL — 530

PROCESS CONTENT BASED ON OBTAINED CONTENT OUTPUT
CONTROL SIGNAL AND DISPLAY PROCESSED CONTENT — 540

END

Figure 17:
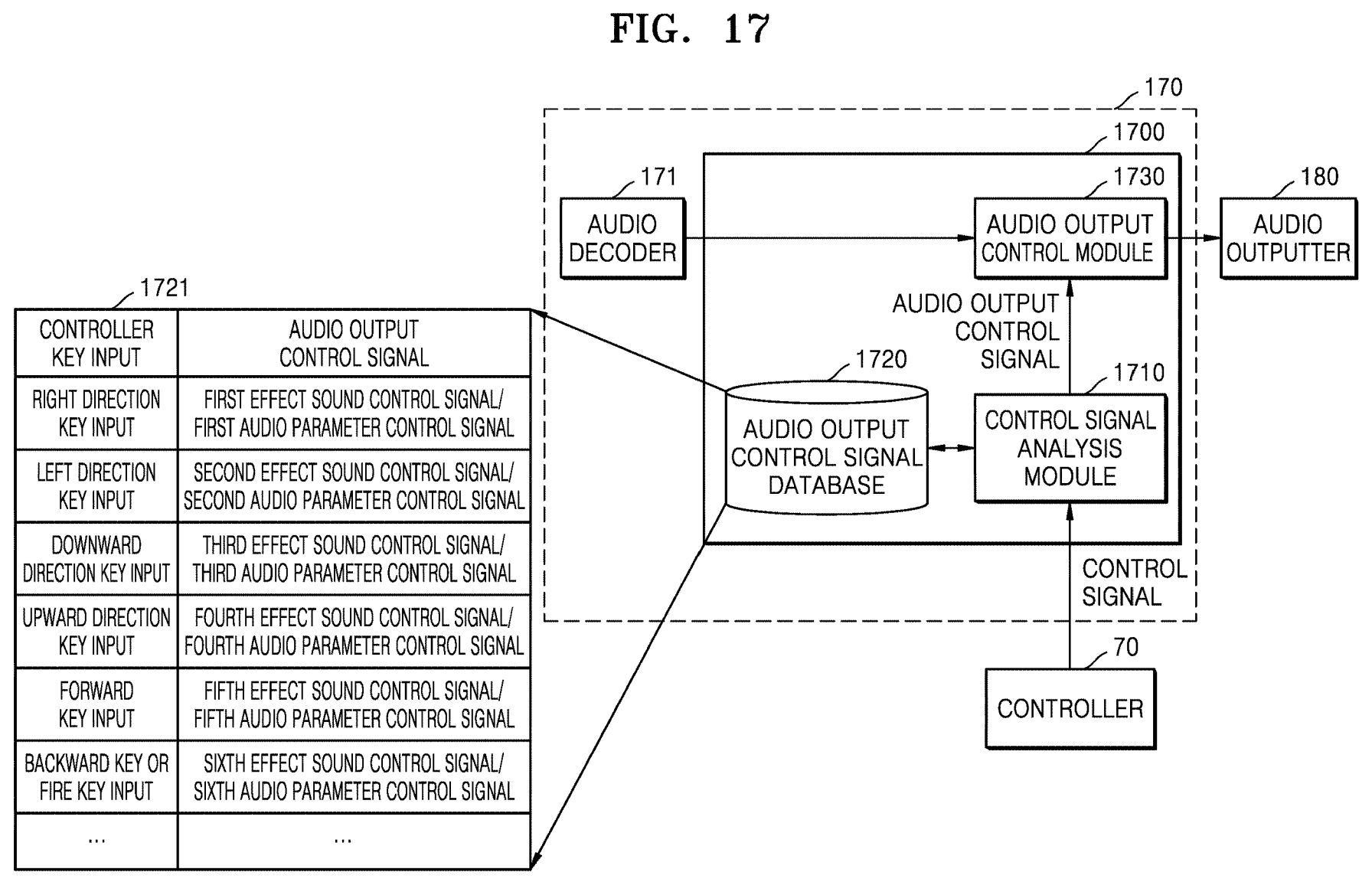

| CONTROLLER KEY INPUT | AUDIO OUTPUT CONTROL SIGNAL |
|---|---|
| RIGHT DIRECTION KEY INPUT | FIRST EFFECT SOUND CONTROL SIGNAL/ FIRST AUDIO PARAMETER CONTROL SIGNAL |
| LEFT DIRECTION KEY INPUT | SECOND EFFECT SOUND CONTROL SIGNAL/ SECOND AUDIO PARAMETER CONTROL SIGNAL |
| DOWNWARD DIRECTION KEY INPUT | THIRD EFFECT SOUND CONTROL SIGNAL/ THIRD AUDIO PARAMETER CONTROL SIGNAL |
| UPWARD DIRECTION KEY INPUT | FOURTH EFFECT SOUND CONTROL SIGNAL/ FOURTH AUDIO PARAMETER CONTROL SIGNAL |
| FORWARD KEY INPUT | FIFTH EFFECT SOUND CONTROL SIGNAL/ FIFTH AUDIO PARAMETER CONTROL SIGNAL |
| BACKWARD KEY OR FIRE KEY INPUT | SIXTH EFFECT SOUND CONTROL SIGNAL/ SIXTH AUDIO PARAMETER CONTROL SIGNAL |
| ... | ... |

ELECTRONIC APPARATUS AND METHOD OF OPERATING THE SAME

CROSS-REFERENCE TO RELATED APPLICATIONS

This application is a continuation of International Application PCT/KR2023/004679, filed Apr. 6, 2023, and claims foreign priority to Korean Application 10-2022-0043062, filed Apr. 6, 2022, the disclosures of which are incorporated herein by reference in their entireties.

TECHNICAL FIELD

Various embodiments of the disclosure relate to an electronic apparatus and a method of operating the electronic apparatus, and more particularly, to an electronic apparatus, which processes a user input for controlling content displayed on the electronic apparatus, and a method of operating the electronic apparatus.

BACKGROUND ART

Cloud gaming refers to any games, including high-end games, which may be used anytime everywhere through the cloud even without game consoles or gaming personal computers (PCs). Because all operations of cloud games are processed by cloud servers, and results thereof are compressed and transmitted as video data in real time, user terminals may process only decoding and screen display operations. Therefore, cloud gaming has good aspects in that it is allowed to enjoy high-end realistic games even via low-end PCs or low-priced mobile devices without limitation so long as network speeds are supported.

However, to provide visual feedback on key-inputs to users in cloud gaming environments, various processing times are required. Time periods from key-inputs of users to the provision of visual feedback may include time periods for controller-inputs of users to be transmitted to cloud servers through networks, time periods for the cloud servers to process operations of updating next screens of games in response to such controller-inputs, time periods for the cloud servers to perform image compression on the generated next screens and transmit compressed images to user terminals through the networks, time periods for the user terminals to decode received images and display the decoded images on screens of the user terminals, and the like. Accordingly, there is an issue in that the consecutive accumulation of such a series of time delays generates response delays of generally about 100 ms. Because such response delays having larger values than expected cause game players to lose interest, those response delays may be referred to as core quality attributes that need to be very significantly managed when cloud game systems are configured. Results of quantifying such quality attributes are referred to as "latency", and when it is assumed that a time point of a key-input of a controller is t1 and a time point of updating a screen of a terminal by reflecting a result of the key-input on the screen is t2, the latency is generally defined as a value of t2–t1.

One of the techniques for reducing latency in cloud games is a mobile edge computing (MEC) technique. The MEC technique has been introduced to be used for services requiring fast response times, such as augmented reality (AR)/virtual reality (VR) or autonomous driving, as well as for cloud games, by reducing response times of 5G mobile devices. The MEC technique may reduce transmission delays by reducing data transmission stages in mobile terminal environments from existing 4 stages to 2 stages by installing, inside switching centers, services provided through existing data servers.

In addition, to reduce the latency of cloud games, there is a method of adjusting resolutions and frame rates of compressed images to be low.

Such techniques focus on optimizing data transmission processes or paths of cloud servers to reduce the latency of cloud games, but there is relatively little active discussion about optimization in terminals. There is a need for methods of effectively providing instant feedback to users only through processing in terminals.

DESCRIPTION OF EMBODIMENTS

Technical Problem

Various embodiments of the disclosure are directed to provide an electronic apparatus allowing image output control that allows a user to experience a fast response by causing an image output of a terminal to provide instant visual feedback on a controller key input in a cloud game without separate communication with a cloud server, and also directed to provide a method of operating the electronic apparatus.

Solution to Problem

According to an embodiment of the disclosure, an electronic apparatus may include a communication interface; a memory storing one or more instructions; and a processor configured to execute the one or more instructions stored in the memory to control a display to display content received from a server through the communication interface, obtain a control signal corresponding to a user input for controlling the content displayed on the display, transmit the obtained control signal to the server through the communication interface; obtain an image output control signal corresponding to the obtained control signal while transmitting the obtained control signal to the server, process the content displayed on the display, based on the obtained image output control signal, control the display to display the content that was processed based on the obtained image output control signal while awaiting, from the server, content processed by the server based on the transmitted obtained control signal, receive the content processed by the server based on the transmitted obtained control signal from the server through the communication interface, and control the display to display the received content processed by the server based on the transmitted obtained control signal.

According to an embodiment of the disclosure, the content received from the server includes original image data of a size greater than a size of the display, and the processor is configured to execute the one or more instructions stored in the memory to identify a region, which is to be output to a screen of the display, from the original image data according to the image output control signal, and control the display to display image data extracted from the identified region.

According to an embodiment of the disclosure, the processor is configured to execute the one or more instructions stored in the memory to move the region to be output to the screen of the display in one of left, right, upward, and downward directions in the original image data, in accordance with the obtained control signal corresponding to the user input being one of left, right, upward, and downward direction key inputs, and control the display to display image data extracted from the moved region.

According to an embodiment of the disclosure, the processor is configured to execute the one or more instructions stored in the memory to reduce or enlarge the region to be output to the screen of the display, in the original image data, in accordance with the obtained control signal corresponding to the user input being one of forward and backward key inputs, and control the display to display image data extracted from the reduced or enlarged region.

According to an embodiment of the disclosure, the electronic apparatus further includes a database storing image output control signals mapped respectively in correspondence with control signals corresponding to one or more user inputs, wherein the processor is configured to execute the one or more instructions stored in the memory to obtain the image output control signal corresponding to the obtained control signal corresponding to the user input by referring to the database.

According to an embodiment of the disclosure, the content received from the server further includes audio data, and the processor is configured to execute the one or more instructions stored in the memory to obtain an audio output control signal corresponding to the obtained control signal corresponding to the user input, process the audio data received from the server, based on the obtained audio output control signal, and control an audio outputter to output the processed audio data.

According to an embodiment of the disclosure, the electronic apparatus further includes a database storing audio output control signals mapped respectively in correspondence with control signals corresponding to one or more user inputs, wherein the processor is configured to execute the one or more instructions stored in the memory to obtain the audio output control signal corresponding to the obtained control signal corresponding to the user input by referring to the database.

According to an embodiment of the disclosure, the audio output control signal includes an effect sound control signal, and the processor is configured to execute the one or more instructions stored in the memory to obtain the effect sound control signal corresponding to the obtained control signal corresponding to the user input, process an effect sound, based on the obtained effect sound control signal, and control the audio outputter to mix and output the audio data received from the server and the processed effect sound.

According to an embodiment of the disclosure, the audio output control signal includes an audio parameter control signal, and the processor is configured to execute the one or more instructions stored in the memory to obtain the audio parameter control signal corresponding to the obtained control signal corresponding to the user input, and adjust the audio data received from the server according to the obtained audio parameter control signal and control the audio outputter to output the adjusted audio data.

According to an embodiment of the disclosure, a method of operating an electronic apparatus may include displaying, on a display, content received from a server; obtaining a control signal corresponding to a user input for controlling the content displayed on the display; transmitting the obtained control signal to the server; obtaining an image output control signal corresponding to the obtained control signal while transmitting the obtained control signal to the server; processing the content displayed on the display, based on the obtained image output control signal; displaying the content that was processed based on the obtained image output control signal while awaiting, from the server, content processed by the server based on the transmitted obtained control signal; receiving the content processed by the server based on the transmitted obtained control signal from the server, and controlling the display to display the received content processed by the server based on the transmitted obtained control signal.

According to an embodiment of the disclosure, the content received from the server includes original image data of a size greater than a size of the display, and the method further comprises identifying a region, which is to be output to a screen of the display, from the original image data according to the image output control signal, and controlling the display to display image data extracted from the identified region.

According to an embodiment of the disclosure, the method further includes moving the region to be output to the screen of the display in one of left, right, upward, and downward directions in the original image data, in accordance with the obtained control signal corresponding to the user input being one of left, right, upward, and downward direction key inputs; and controlling the display to display image data extracted from the moved region.

According to an embodiment of the disclosure, the method further includes reducing or enlarging the region to be output to the screen of the display, in the original image data, in accordance with the obtained control signal corresponding to the user input being one of forward and backward key inputs; and controlling the display to display image data extracted from the reduced or enlarged region.

According to an embodiment of the disclosure, the electronic apparatus includes a database storing image output control signals mapped respectively in correspondence with control signals corresponding to one or more user inputs, and the method further comprises obtaining the image output control signal corresponding to the obtained control signal corresponding to the user input by referring to the database.

According to an embodiment of the disclosure, the content received from the server further comprises audio data, and the method further comprises obtaining an audio output control signal corresponding to the obtained control signal corresponding to the user input, processing the audio data received from the server, based on the obtained audio output control signal, and outputting the processed audio data.

According to an embodiment of the disclosure, the electronic apparatus includes a database storing audio output control signals mapped respectively in correspondence with control signals corresponding to one or more user inputs, and the method further comprises obtaining the audio output control signal corresponding to the obtained control signal corresponding to the user input by referring to the database.

According to an embodiment of the disclosure, the audio output control signal includes an effect sound control signal, and the method further comprises obtaining the effect sound control signal corresponding to the obtained control signal corresponding to the user input, processing an effect sound based on the obtained effect sound control signal, and mixing and outputting the audio data received from the server and the processed effect sound.

According to an embodiment of the disclosure, the audio output control signal includes an audio parameter control signal, and the method further comprises obtaining the audio parameter control signal corresponding to the obtained control signal corresponding to the user input, and adjusting the audio data received from the server according to the obtained audio parameter control signal and outputting the adjusted audio data.

According to an embodiment of the disclosure, a computer-readable recording medium may have recorded thereon one or more programs executable by a processor of an electronic apparatus to implement a method of operating the electronic apparatus, the method including displaying, on a display, content received from a server; obtaining a control signal corresponding to a user input for controlling the content displayed on the display; transmitting the obtained control signal to the server; obtaining an image output control signal corresponding to the obtained control signal while transmitting the obtained control signal to the server; processing the content displayed on the display, based on the obtained image output control signal; displaying the content that was processed based on the obtained image output control signal while awaiting, from the server, content processed by the server based on the transmitted obtained control signal; receiving the content processed by the server based on the transmitted obtained control signal from the server, and controlling the display to display the received content processed by the server based on the transmitted obtained control signal.

Advantageous Effects of Disclosure

According to various embodiments of the disclosure, by allowing an image output of a terminal to provide instant visual feedback on a controller key input in a cloud game to a screen even before the terminal receives a response from a cloud server, a user may experience a fast response.

BRIEF DESCRIPTION OF DRAWINGS

FIG. 5 is a flowchart illustrating an example of a method of operating an electronic apparatus, according to an embodiment of the disclosure.

FIG. 6 illustrates an example of outputting a remote processing result and a local processing result, which are obtained by processing a control signal corresponding to a user input, according to an embodiment of the disclosure.

FIG. 17 illustrates an example of a local processing module, which controls an audio output according to a control signal corresponding to a user input, in an electronic apparatus, according to an embodiment of the disclosure.

MODE OF DISCLOSURE

Figure 1:
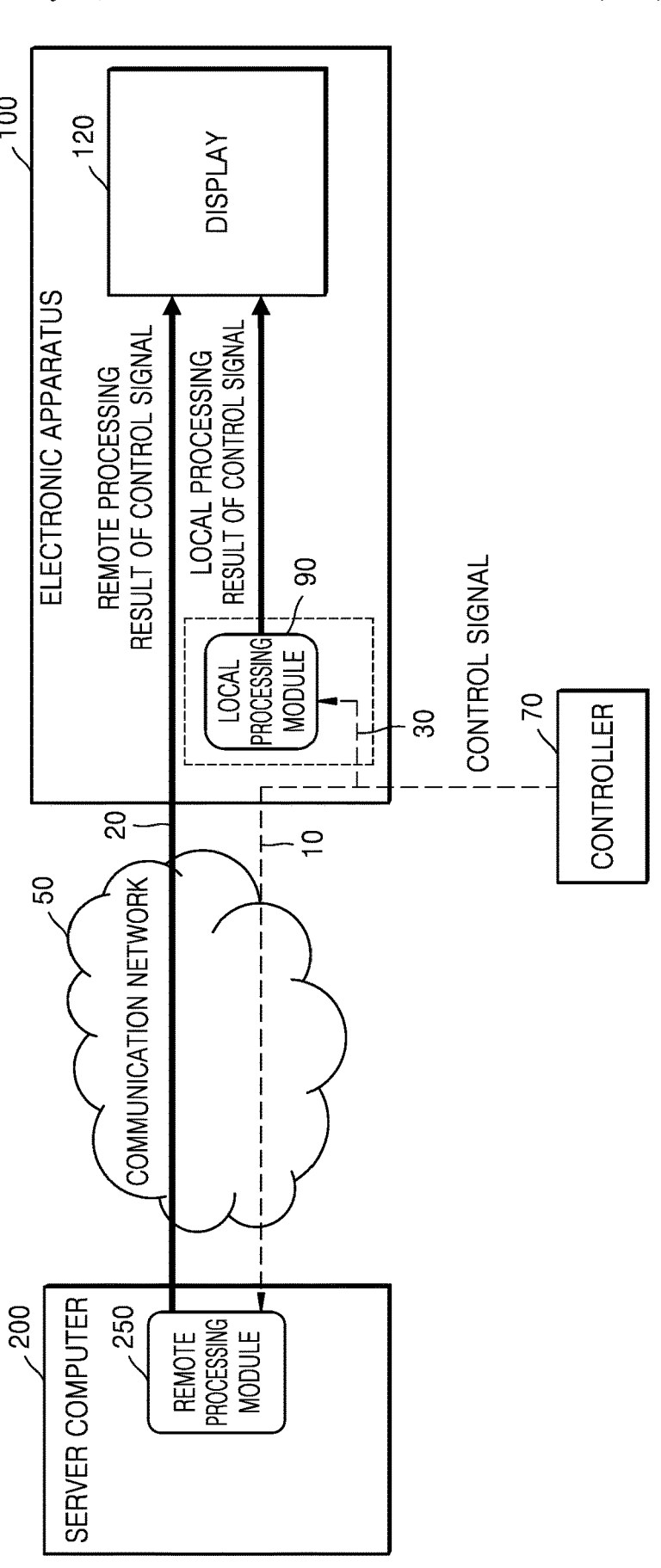
FIG. 1 is a reference diagram illustrating a system allowing quicker visual feedback on a control input for content streamed from a server, according to various embodiments of the disclosure.

Throughout the disclosure, the expression "at least one of a, b or c" indicates only a, only b, only c, both a and b, both a and c, both b and c, all of a, b, and c, or variations thereof.

After terms used herein are briefly described, the disclosure will be described in detail.

Although terms used herein are from among general terms which are currently and broadly used while considering functions in the disclosure, these terms may vary according to intentions of those of ordinary skill in the art, precedents, the emergence of new technologies, or the like. In addition, there may be terms selected arbitrarily by the applicants in particular cases, and in these cases, the meaning of those terms will be described in detail in the corresponding portions of the detailed description. Therefore, the terms used herein should be defined based on the meaning thereof and descriptions made throughout the specification, rather than simply based on the names thereof.

It will be understood that, throughout the specification, when a region such as an element, a component, a layer, or the like is referred to as "comprising" or "including" a component such as an element, a region, a layer, or the like, the region may further include another component in addition to the component rather than exclude the other component, unless otherwise stated. In addition, the term such as " . . . unit", " . . . portion", " . . . module", or the like used herein refers to a unit for processing at least one function or operation, and this may be implemented by hardware, software, or a combination of hardware and software.

Hereinafter, for those of ordinary skill in the art to implement the disclosure with ease, embodiments of the disclosure will be described in detail with reference to the accompanying drawings. However, it should be understood that the disclosure is not limited to embodiments described herein and may be embodied in different ways. In addition, in the drawings, portions irrelevant to the description are omitted for clarity, and like components are denoted by like reference numerals throughout the specification.

As used herein, the term "user" refers to a person, which controls functions or operations of a computing device or an electronic device by using a control device, and may include a viewer, a manager, or an installation engineer.

FIG. 1 is a reference diagram illustrating a system allowing quicker visual feedback on a control input for content streamed from a server, according to various embodiments of the disclosure.

Referring to FIG. 1, the system may include an electronic apparatus 100, a server computer 200, and a communication network 50 allowing communication between the electronic apparatus 100 and the server computer 200.

The server computer 200 may communicate with the electronic apparatus 100 through the communication network 50. The server computer 200 may provide content to the electronic apparatus 100, according to a content request from the electronic apparatus 100. The content provided to the electronic apparatus 100 by the server computer 200 may include various content, such as video content, audio content, and game content. When the server computer 200 provides game content to the electronic apparatus 100, the server computer 200 may receive a user input for the game content from the electronic apparatus 100, may perform an operation and processing, which correspond to the user input, and may transmit a processing result to the electronic apparatus 100 through the communication network 50.

The electronic apparatus 100 may communicate with the server computer 200 through the communication network 50. The electronic apparatus 100 may transmit a content request to the server computer 200 according to a user input for requesting content, may receive the requested content from the server computer 200 in response thereto, and may display the received content. In the instance where the electronic apparatus 100 receives game content from the server computer 200 and displays the game content, when the electronic apparatus 100 receives a user input for controlling the displayed game content, the electronic apparatus 100 may transfer the received user input to the server computer 200, may receive a result image, which is obtained by processing in response to the user input, from the server computer 200, and may display the result image.

The electronic apparatus 100 may receive a user input for controlling content, through various user input means. The electronic apparatus 100 may receive, from a controller 70 shown in FIG. 1, a control signal corresponding to the user input for controlling the content. The controller 70 may include a game-only controller, a remote controller, or a smart device such as a smartphone. In addition, it is a matter of course that the electronic apparatus 100 may receive the user input through a user input means provided to the electronic apparatus 100.

Referring to FIG. 1, according to the related art, when the electronic apparatus 100 receives, from the controller 70, a control signal corresponding to a user input for controlling content displayed on a display 120, the electronic apparatus 100 transfers the received control signal to the server computer 200 through a path 10. The server computer 200 receiving the control signal performs an operation or processing corresponding to the control signal via a remote processing module 250 and transfers a processing result to the electronic apparatus 100 through a path 20. As such, because the processing of the control signal for controlling the content is performed by the remote processing module 250 of the server computer 200, and a result of this processing is received by the electronic apparatus 100 through the communication network 50, an output of a result image, which is displayed on the electronic apparatus 100 in correspondence with the user input, has no choice but to be delayed, and thus, the immersion of a user that uses the content may be inevitably lowered after all.

Therefore, in embodiments of the disclosure, to reduce such a delay of feedback corresponding to a user input, while a control signal for controlling content is transferred to the server computer 200 to perform remote processing, a local processing module 90, to which the control signal is transferred through a path 30, in the electronic apparatus 100 is provided for quick feedback. The local processing module 90 may receive a control signal from the controller 70, process the control signal, and instantly provide a processing result to the display 120. Therefore, even before the electronic apparatus 100 receives, from the server computer 200, a remote processing result obtained by remotely processing the control signal, by displaying, on the display 120 in advance, a local processing result obtained by locally processing the control signal, the electronic apparatus 100 may allow a user to feel as if instant feedback corresponding to the user input is generated.

The electronic apparatus 100 may refer to an apparatus that includes a display and thus may display image content, video content, game content, graphic content, and the like. The electronic apparatus 100 may output or display an image or content received from a device 200. For example, the electronic apparatus 100 may include various types of electronic apparatuses capable of receiving and displaying content, such as a network television (TV), a smart TV, an Internet TV, a web TV, an Internet protocol TV (IPTV), a personal computer (PC), and the like. The electronic apparatus 100 may be referred to as an electronic apparatus in terms of receiving and displaying content, and in addition, may also be referred to as a content receiving device, a sink device, an electronic device, a computing device, a display device, or the like.

According to an embodiment of the disclosure, the electronic apparatus 100 may control a display to display content received from the server computer 200, may obtain a control signal corresponding to a user input for controlling the content displayed on the display, may obtain an image output control signal corresponding to the obtained control signal while transmitting the obtained control signal to the server computer 200 to process the content based on the obtained control signal, may process the content displayed based on the obtained image output control signal, and may control the display to display the processed content.

According to an embodiment of the disclosure, the electronic apparatus 100 may receive content including original image data, which is greater in size than the display, may determine a region to be output to the display in the original image data according to the image output control signal, and may control the display to display image data extracted from the determined region.

According to an embodiment of the disclosure, the electronic apparatus 100 may move the region to be output to the display in the original image data in one of left, right, upward, and downward directions in accordance with the control signal being one of left, right, upward, and downward direction key inputs, and may control the display to display image data extracted from the moved region.

According to an embodiment of the disclosure, the electronic apparatus 100 may reduce or enlarge the region to be output to the display in the original image data in accordance with the control signal being one of forward and backward key inputs, and may control the display to display image data extracted from the reduced or enlarged region.

According to an embodiment of the disclosure, the electronic apparatus 100 may further include a database storing image output control signals mapped respectively in correspondence with control signals corresponding to one or more user inputs and may obtain the image output control signal corresponding to the obtained control signal by referring to the database.

According to an embodiment of the disclosure, the electronic apparatus 100 may obtain an audio output control signal corresponding to the obtained control signal, may process audio data received from the server computer 200 based on the obtained control signal, and may control an audio outputter to output the processed audio data.

According to an embodiment of the disclosure, the electronic apparatus 100 may further include a database storing image output control signals mapped respectively in correspondence with control signals corresponding to one or more user inputs and may obtain the audio output control signal corresponding to the obtained control signal by referring to the database.

According to an embodiment of the disclosure, the electronic apparatus 100 may obtain an effect sound control signal corresponding to the obtained control signal, may process an effect sound based on the obtained effect sound control signal, and may control the audio outputter to mix and output audio data received from the server computer 200 and the processed effect sound.

According to an embodiment of the disclosure, the electronic apparatus 100 may obtain an audio parameter control signal corresponding to the obtained control signal, may adjust audio data received from the server computer 200, according to the obtained audio parameter control signal, and may control the audio outputter to output the adjusted audio data.

Figure 2:
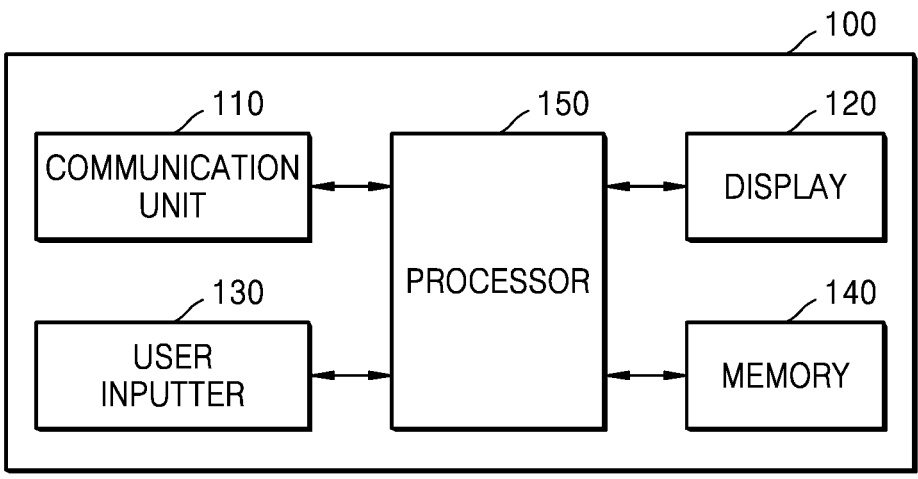
FIG. 2 is an example of a block diagram of an electronic apparatus according to an embodiment of the disclosure.

FIG. 2 is an example of a block diagram of an electronic apparatus according to an embodiment of the disclosure.

Referring to FIG. 2, the electronic apparatus 100 may process and output an image signal and/or an audio signal received from the server computer 200.

The electronic apparatus 100 may include a communication unit 110, the display 120, a user inputter 130, a memory 140, and a processor 150.

The communication unit 110 may transmit a request for content to the server computer 200 according to control by the processor 150 and may receive the requested content in response thereto from the server computer 200. In addition, the communication unit 110 may transmit, to the server computer 200, a control signal corresponding to a user input for controlling content displayed on the electronic apparatus 100, according to control by the processor 150, and may receive, from the server computer 200 in response thereto, a content processing result obtained according to the control signal.

The display 120 may display the content received from the server computer 200 according to control by the processor 150.

Although the electronic apparatus 100 is shown as including the display 120 in the example shown in FIG. 2, disclosed embodiments of the disclosure are not limited thereto. The electronic apparatus 100 may output an image processed by the electronic apparatus 100 to an external display or monitor through a video/audio output port, instead of including the display 120.

The user inputter 130 may receive a user input for controlling the content displayed on the display 120. The user inputter 130 may include a communication means for receiving a control signal from the controller 70, or a user input means provided to the electronic apparatus 100.

The memory 140 may store a program related to an operation of the electronic apparatus 100, and various data generated during an operation of the electronic apparatus 100.

The processor 150 controls overall operations of the electronic apparatus 100.

According to an embodiment of the disclosure, the processor 150 may execute instructions stored in the memory 140 to: control a display to display content received from the server computer 200; obtain a control signal corresponding to a user input for controlling the content displayed on the display; obtain an image output control signal corresponding to the obtained control signal while transmitting the obtained control signal to the server computer 200 to process the content based on the obtained control signal; process the content displayed based on the obtained image output control signal; and control the display to display the processed content.

According to an embodiment of the disclosure, the processor 150 may execute the instructions stored in the memory 140 to: receive the content including original image data, which is greater in size than a screen of the display; determine a region, which is to be output to the screen of the display, in the original image data according to the image output control signal; and control the display to display image data extracted from the determined region.

According to an embodiment of the disclosure, the processor 150 may execute the instructions stored in the memory 140 to: move the region, which is to be output to the screen of the display, in the original image data in one of left, right, upward, and downward directions in accordance with the control signal being one of left, right, upward, and downward direction key inputs; and control the display to display image data extracted from the moved region.

According to an embodiment of the disclosure, the processor 150 may execute the instructions stored in the memory 140 to: reduce or enlarge the region, which is to be output to the screen of the display, in the original image data in accordance with the control signal being one of forward and backward key inputs; and control the display to display image data extracted from the reduced or enlarged region.

According to an embodiment of the disclosure, the electronic apparatus 100 may further include a database storing image output control signals mapped respectively in correspondence with control signals corresponding to one or more user inputs, and the processor 150 may execute the instructions stored in the memory 140 to obtain the image output control signal corresponding to the obtained control signal by referring to the database.

According to an embodiment of the disclosure, the processor 150 may execute the instructions stored in the memory 140 to: obtain an audio output control signal corresponding to the obtained control signal; process audio data received from the server computer 200 based on the obtained control signal; and control an audio outputter to output the processed audio data.

According to an embodiment of the disclosure, the electronic apparatus 100 may further include a database storing audio output control signals mapped respectively in correspondence with control signals corresponding to one or more user inputs, and the processor 150 may execute the instructions stored in the memory 140 to obtain the audio output control signal corresponding to the obtained control signal by referring to the database.

According to an embodiment of the disclosure, the processor 150 may execute the instructions stored in the memory 140 to: obtain an effect sound control signal corresponding to the obtained control signal; process an effect sound based on the obtained effect sound control signal; and control the audio outputter to mix and output audio data received from the server computer 200 and the processed effect sound.

According to an embodiment of the disclosure, the processor 150 may execute the instructions stored in the memory 140 to: obtain an audio parameter control signal corresponding to the obtained control signal; adjust audio data received from the server computer 200, according to the obtained audio parameter control signal; and control the audio outputter to output the adjusted audio data.

Figure 3:
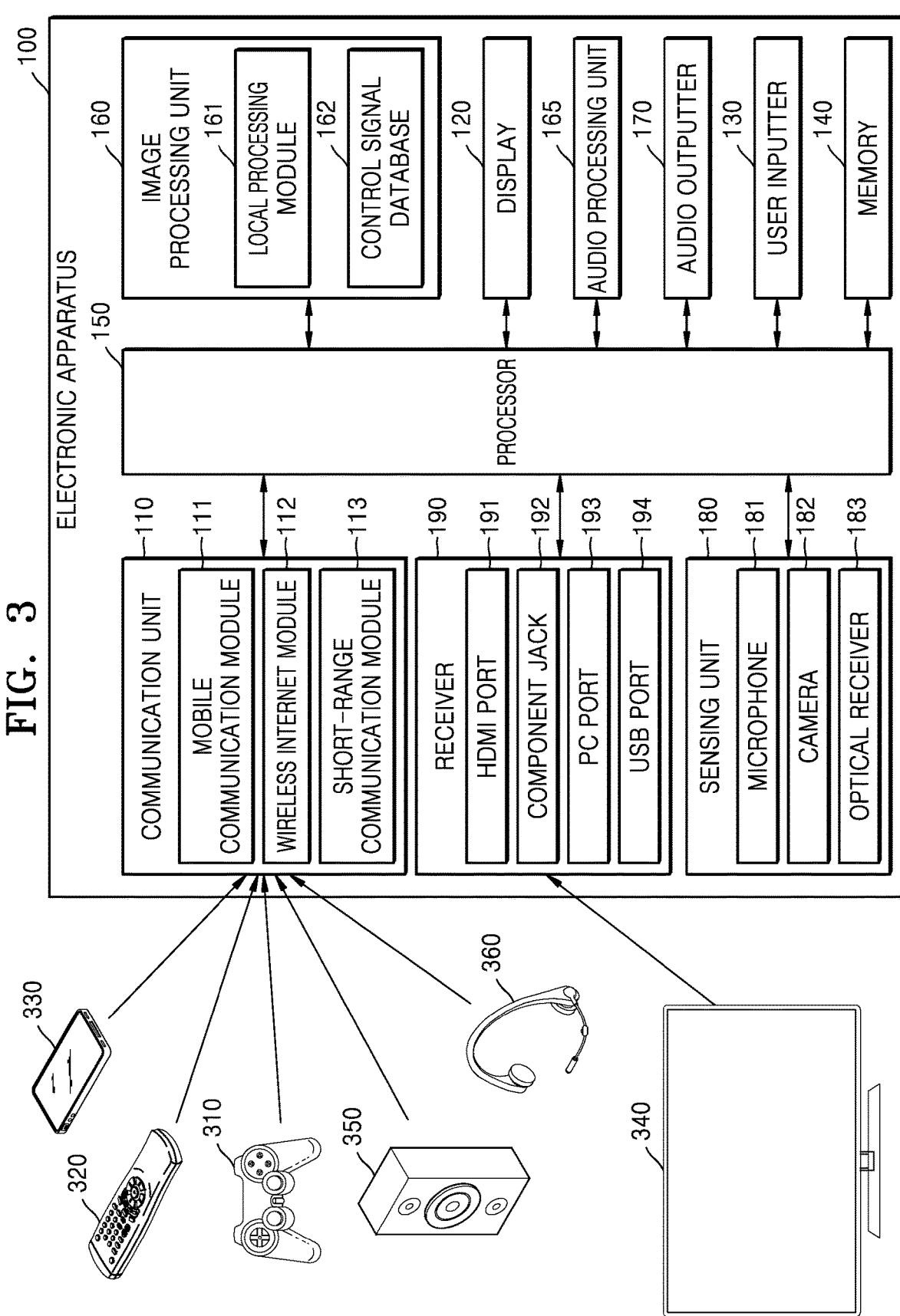
FIG. 3 is a particular block diagram of an electronic apparatus according to an embodiment of the disclosure.

FIG. 3 is a particular block diagram of the electronic apparatus 100 according to an embodiment of the disclosure.

Referring to FIG. 3, the electronic apparatus 100 may further include an image processing unit 160, an audio processing unit 165, an audio outputter 170, a sensing unit 180, and a receiver 190, in addition to the communication unit 110, the display 120, the user inputter 130, the memory 140, and the processor 150.

The communication unit 110 may include one or more modules allowing wireless communication between the electronic apparatus 100 and a wireless communication system or between the electronic apparatus 100 and a network on which another electronic apparatus is located. For example, the communication unit 110 may include a mobile communication module 111, a wireless internet module 112, and a short-range communication module 113.

The mobile communication module 111 transmits radio signals to and receives radio signals from at least one of a base station, an external terminal, or a server on a mobile communication network. The radio signal may include a voice call signal, a video call signal, or various types of data according to the transmission and reception of text/multimedia messages.

The wireless internet module 112 refers to a module for wireless internet access and may be embedded in or mounted outside a device. As a wireless internet technique, Wireless Local Area Network (WLAN) (for example, WiFi), Wireless broadband (Wibro), World Interoperability for Microwave Access (Wimax), High Speed Downlink Packet Access (HSDPA), or the like may be used.

The short-range communication module 113 refers to a module for short-range communication. As a short-range communication technique, Bluetooth, Bluetooth Low Energy (BLE), Radio Frequency Identification (RFID), infrared Data Association (IrDA), Ultra Wideband (UWB), ZigBee, or the like may be used.

The electronic apparatus 100 may communicate with the server computer 200 through the mobile communication module 111 or the wireless internet module 112, which is provided to the communication unit 110. By communicating with the server computer 200 through the communication unit 110, the electronic apparatus 100 may receive content from the server computer 200, transfer a control signal from the controller 70 to the server computer 200, or receive, from the server computer 200, a remote processing result based on a control signal.

The electronic apparatus 100 may receive a control signal from the controller 70, which controls content, through the mobile communication module 111 or the wireless internet module 112, which is provided to the communication unit 110.

The display 120 may display, on a screen, an image signal received from the image processing unit 160.

The image processing unit 160 may process an image signal received from the receiver 190 or the communication unit 110 and output the image signal to the display 120, according to control by the processor 150. The image processing unit 160 performs processing on an image signal received by the electronic apparatus 100. The image processing unit 160 may perform various image processing, such as decoding, scaling, noise removal, frame rate conversion, and resolution conversion, on video data.

In particular, according to an embodiment of the disclosure, the image processing unit 160 may include a local processing module 161 and a control signal database 162.

The local processing module 161 may receive a control signal corresponding to a user input for controlling content displayed on the display 120, may obtain a control signal for processing the content according to the received control signal, and may control an image output or an audio output based on the obtained control signal for processing the content. To obtain the control signal for processing the content based on the control signal corresponding to the user input, the local processing module 161 may refer to the control signal database 162.

The control signal database 162 may include a mapping table for converting the control signal corresponding to the user input into a control signal for image output or a control signal for audio output. The mapping table of the control signal database 162 will be described with reference to FIG. 4.

The audio processing unit 165 may convert an audio signal, which is received from the receiver 190 or the communication unit 110, into an analog audio signal and output the analog audio signal to the audio outputter 170, according to control by the processor 150. The audio processing unit 165 may perform various processing, such as decoding, amplification, and noise removal, on audio data. The audio processing unit 165 may include a plurality of audio processing modules for processing pieces of audio corresponding to a plurality of pieces of content, respectively.

In the example shown in FIG. 3, although the image processing unit 160 and the audio processing unit 165 are configured separately from the processor 150, embodiments of the disclosure are not limited thereto. According to disclosed embodiments of the disclosure, by including the image processing unit 160 and the audio processing unit 165 in the processor 150, the processor 150 may perform a function of the image processing unit 160 and a function of the audio processing unit 165.

The audio outputter 170 may output the received analog audio signal through a speaker. The audio outputter 170 may include at least one of a speaker, a headphone output terminal, or a Sony/Philips Digital Interface (S/PDIF) output terminal, or a combination thereof.

The sensing unit 180 senses a speech of a user, an image of the user, or an interaction of the user.

A microphone 181 receives an uttered speech of the user. The microphone 181 may convert the received speech into an electrical signal and output the electrical signal to the processor 150. The speech of the user may include, for example, a speech corresponding to a menu or a function of the electronic apparatus 100. A recognition range of the microphone 181 is recommended to be within 4 m from the microphone 181 to a location of the user and may vary in correspondence with the magnitude of a voice of the user and a surrounding environment (for example, a speaker sound or ambient noise) of the user.

A camera 182 receives an image (for example, consecutive frames) corresponding to a motion of the user, which includes a gesture, in a camera recognition range. For example, the recognition range of the camera 182 may be within a distance of about 0.1 m to about 5 m from the camera 182 to the user. The motion of the user may include, for example, a motion of a portion of the body of the user or a portion of the user, such as the face, facial expression, hand, fist, or finger of the user. The camera 182 may convert the received image into an electrical signal and output the electrical signal to the processor 150, according to control by the processor 150. The processor 150 may select a menu displayed on the electronic apparatus 100, by using a recognition result of the received motion, or may perform control corresponding to the recognition result of the received motion. For example, the menu selected by the processor 150 or the control performed by the processor 150 may include channel adjustment, volume adjustment, or indicator movement.

An optical receiver 183 receives an optical signal (including a control signal) received from an external controller. The optical receiver 183 may receive, from the controller 70, an optical signal corresponding to a user input (for example, a touch, a push, a touch gesture, a speech, or a motion). A control signal may be extracted from the received optical signal by control by the processor 150.

The electronic apparatus 100 may receive audio data including a speech of the user from a remote controller 320 as well as through the microphone 181 of the sensing unit 180. Specifically, the remote controller 320 may include a microphone, may obtain audio data, which is digitally converted from a speech signal of the user, when receiving the speech signal of the user through the microphone, and may transmit the audio data to the electronic apparatus 100 by using a wireless communication technique according to a Bluetooth protocol or a WiFi protocol, and the electronic apparatus 100 may receive the audio data from the remote controller 320.

In addition, the electronic apparatus 100 may receive the audio data including the speech of the user through a smart device, for example, a smartphone 330, in which a remote control application is installed. Specifically, the smart device may control the electronic apparatus 100 or perform a speech recognition function, by executing the installed remote control application. When the smart device receives a speech signal of the user through the remote control application or other applications or the like, the smart device may obtain audio data digitally converted from the speech signal of the user and may transmit the audio data to the electronic apparatus 100 by using a wireless communication technique according to a Bluetooth protocol or a WiFi protocol, and the electronic apparatus 100 may receive the audio data from the smart device. The smart device, which controls the electronic apparatus 100 by executing the remote control application, may include an artificial intelligence (AI) speaker or other various personal portable devices as well as a smartphone.

The receiver 190, according to control by the processor 150, may receive an image signal and an audio signal, which are received from an external input device, according to a protocol connected to the receiver 190 and may respectively transmit the image signal and the audio signal to the image processing unit 160 and the audio processing unit 165.

The receiver 190 may receive a video (for example, a moving image or the like), audio (for example, a speech, music, or the like), additional information (for example, an electronic program guide (EPG) or the like), and the like from outside the electronic apparatus 100, by control by the processor 150. The receiver 190 may include one of a High-Definition Multimedia Interface (HDMI) port 191, a component jack 192, a PC port 193, and a USB port 194 or include a combination of one or more thereof. The receiver 190 may further include DisplayPort (DP), Thunderbolt, and Mobile High-Definition Link (MHL), in addition to the HDMI port.

The memory 140 may store a program related to an operation of the electronic apparatus 100 or various data generated during an operation of the electronic apparatus 100.

According to an embodiment of the disclosure, the memory 140 may store various data, programs, or applications for driving and controlling the electronic apparatus 100 by control by the processor 150. The memory 140 may store a control program for controlling the electronic apparatus 100 and the processor 150, an application that is provided initially by a manufacturer or downloaded from outside the electronic apparatus 100, a graphical user interface (GUI) related to the application, an object (for example, an image, text, an icon, a button, or the like) for providing the GUI, user information, a document, databases, or related data.

In an embodiment of the disclosure, the term "memory" includes the memory 140, read-only memory (ROM) or random access memory (RAM) that may be included in the processor 150, or a memory card (for example, a micro SD card or USB memory) mounted to the electronic apparatus 100. In addition, the memory 140 may include nonvolatile memory, volatile memory, a hard disk drive (HDD), or a solid-state drive (SSD). The processor 150 performs a function of controlling overall operations of the electronic apparatus 100 and signal flow between internal components of the electronic apparatus 100 and processing data. When an input from the user is provided or satisfies a preset and stored condition, the processor 150 may execute an operating system (OS) and various applications, which are stored in the memory 140.

The processor 150 may include RAM, which stores a signal or data that is input from outside the electronic apparatus 100 or is used as a storage area corresponding to various tasks performed by the electronic apparatus 100, and ROM in which a control program for controlling the electronic apparatus 100 is stored. The processor 150 may include a graphics processing unit (GPU) for graphic processing corresponding to a video. The processor 150 may be implemented by a system-on-chip (SoC) into which a core and a GPU are integrated. The processor 150 may include a single core, dual cores, triple cores, quadruple cores, and cores as many as multiples thereof. In addition, the processor 150 may include a plurality of processors. For example, the processor 150 may be implemented by a main processor and a sub-processor that operates in a sleep mode.

The electronic apparatus 100 may receive a control signal corresponding to a user input for controlling content, through various input means. For example, the electronic apparatus 100 may receive a control signal corresponding to a user input for controlling content, from a game controller 310 connected thereto through Bluetooth communication or WiFi communication. The game controller 310 may include one or more keys or buttons, and thus, the electronic apparatus 100 may receive a control signal generated by pushing such a key or button. For example, the electronic apparatus 100 may receive a control signal corresponding to a user input for controlling content, from the remote controller 320 connected thereto through Bluetooth communication or WiFi communication. The remote controller 320 may include one or more keys or buttons, and thus, the electronic apparatus 100 may receive a control signal generated by pushing such a key or button. For example, the electronic apparatus 100 may receive a control signal corresponding to a user input for controlling content, from the smartphone 330 connected thereto through Bluetooth communication or WiFi communication. The smartphone 330 may include a touchpad or a touch screen, and thus, the electronic apparatus 100 may receive a control signal corresponding to a touch input received through such a touchpad or touch screen. Although FIG. 3 illustrates that the electronic apparatus 100 includes the audio outputter 170, audio data processed by the electronic apparatus 100 is not limited to being necessarily output through the audio outputter 170, in disclosed embodiments of the disclosure. The electronic apparatus 100 may output the processed audio data through an audio outputter, for example, a soundbar, a speaker, a headset, or the like, which is connected to the electronic apparatus 100 in a wired or wireless manner. Referring to FIG. 3, the electronic apparatus 100 may output the processed audio data to a Bluetooth speaker 350 or a Bluetooth headset 360, which is connected thereto through the short-range communication module 113 of the communication unit 110.

Although FIG. 3 illustrates that the electronic apparatus 100 includes the display 120, disclosed embodiments of the disclosure are not limited thereto. The electronic apparatus 100 may be connected to an external monitor or display, instead of including the display 120 therein, and may transmit an image to the external monitor or display connected thereto. Referring to FIG. 3, the electronic apparatus 100 may transmit a content image to an external display device 340 connected to the HDMI port 191 or the like of the receiver 190.

Figure 4:
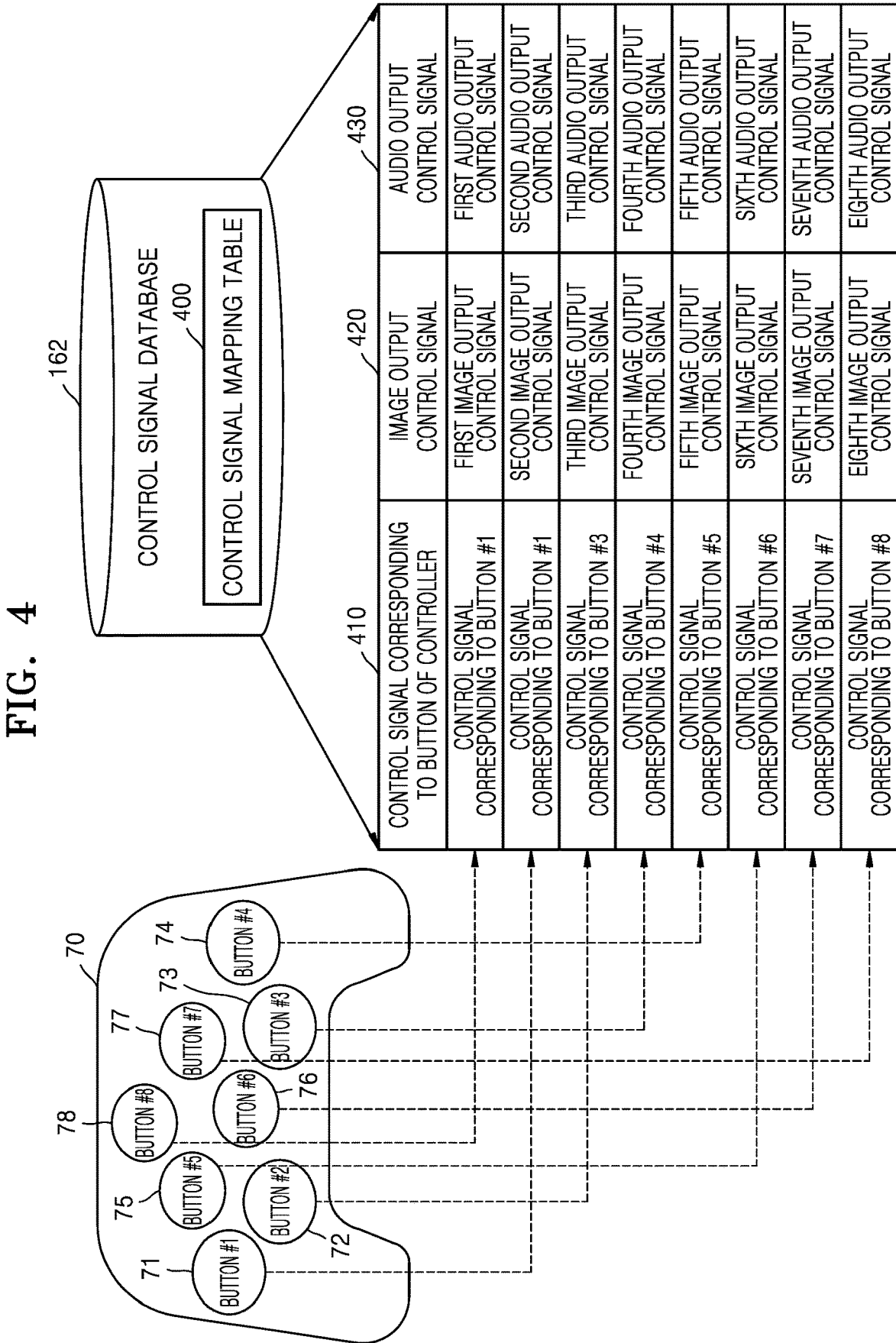
FIG. 4 illustrates an example of a mapping table stored in a control signal database, according to an embodiment of the disclosure.

FIG. 4 illustrates an example of a mapping table stored in a control signal database, according to an embodiment of the disclosure.

Referring to FIG. 4, the controller 70 may include eight buttons from a first button 71 to an eighth button 78, as buttons for controlling content. According to an example of the disclosure, the buttons may include four-way movement buttons for upward, downward, left, and right movements, a forward button, or the like. In addition thereto, the buttons may include eight-way movement buttons including diagonal movement buttons, that is, upward, downward, left, right, top-right, bottom-right, top-left, and bottom-left buttons, or various other buttons.

The control signal database 162 may include a control signal mapping table 400. In the control signal mapping table 400, a control signal corresponding to each button of the controller 70 is mapped to an image output control signal or an audio output control signal. That is, the control signal mapping table 400 may include a data structure in which an image output control signal 420 and an audio output control signal 430 are mapped to a control signal 410 corresponding to each button of a controller. The control signal 410 corresponding to each button of the controller represents a control signal generated by pushing each button of the controller and received from the controller. The image output control signal 420 is a control signal for controlling an image output based on the control signal corresponding to each button of the controller and may include, for example, a command to move an image to be displayed on a display in an upward, downward, left, or right direction, or a command to enlarge or reduce the image to be displayed on the display. The audio output control signal 430 is a control signal for controlling an audio output based on the control signal corresponding to each button of the controller and may include a command to control a parameter of audio to be output to an audio outputter, or a command to control a sound effect for the audio to be output to the audio outputter.

Referring to FIG. 4, in the control signal mapping table 400, a first image output control signal and a first audio output control signal are mapped to a control signal corresponding to the first button 71, and a second image output control signal and a second audio output control signal are mapped to a control signal corresponding to the second button 72. In this manner, an eighth image output control signal and an eighth audio output control signal are mapped to a control signal corresponding to the eighth button 78.

In the example shown in FIG. 4, although the controller 70 is shown in the form of a game controller, the controller 70 is not limited thereto. The controller 70 may include a user input means provided to the electronic apparatus 100 itself, a controller including a touchpad, a smart device paired with the electronic apparatus 100 and having a function of controlling content displayed on the electronic apparatus 100, or the like.

In addition, in the example shown in FIG. 4, although the controller 70 is shown as including a button-type input means, the controller 70 is not limited thereto and may include an input means, such as a joystick, according to disclosed embodiments of the disclosure.

The joystick is an input device manipulated in the manner of holding a long pole-shaped lever, which is referred to as a "stick", and pushing or pulling the lever upward, downward, left, or right, and may be implemented by a square-gate, octagonal-gate, or no-gate lever guide. Lever guides are something like fences of the lever and may be classified into square-gate lever guides, octagonal-gate lever guides, and no-gate lever guides according to shapes of maximum movable ranges of the lever, and even 360-degree direction control may be allowed according to such an input from the joystick. In the example of FIG. 4, when the controller 70 includes one or more buttons, although the image output control signal or the audio output control signal is mapped to a control signal corresponding to each button, when an input means, such as a joystick, which may undergo 360-degree direction control, is used, a control signal mapping table may be configured by mapping a control signal, which corresponds to each angle according to a movement of the joystick, to the image output control signal or the audio output control signal.

Although the example of FIG. 4 illustrates that, in the control signal mapping table 400, both the image output control signal and the audio output control signal are mapped to each control signal, disclosed embodiments of the disclosure are not limited thereto.

According to an embodiment of the disclosure, in the control signal mapping table 400, the image output control signal may be mapped to each control signal. In this case, the electronic apparatus 100 may receive a control signal corresponding to each button and may control an image output of content by obtaining the image output control signal according to the received control signal.

According to an embodiment of the disclosure, in the control signal mapping table 400, the audio output control signal may be mapped to each control signal. In this case, the electronic apparatus 100 may receive a control signal corresponding to each button and may control an output of audio data of content by obtaining the audio output control signal according to the received control signal.

According to an embodiment of the disclosure, in the control signal mapping table 400, both the image output control signal and the audio output control signal may be mapped to each control signal. In this case, the electronic apparatus 100 may receive a control signal corresponding to each button and may control both an image output of content and an output of audio data of the content by obtaining the image output control signal and the audio output control signal according to the received control signal.

FIG. 5 is a flowchart illustrating an example of a method of operating an electronic apparatus, according to an embodiment of the disclosure.

Referring to FIG. 5, in operation 510, the electronic apparatus 100 may receive content from the server computer 200 and display the content. The electronic apparatus 100 may receive, from a user, a request to reproduce the content provided by the server computer 200, and may request, from the server computer 200, the content requested by the user. Accordingly, the electronic apparatus 100 may receive the requested content from the server computer 200 and display the content. The content displayed by the electronic apparatus 100 may include various content, such as video content, audio content, and game content.

In operation 520, the electronic apparatus 100 may receive a control signal corresponding to a user input for controlling the content displayed on a display. The electronic apparatus 100 may receive the control signal corresponding to the user input for controlling the content, through various user input means. According to an example of the disclosure, the electronic apparatus 100 may receive the control signal corresponding to the user input, from the controller 70, for example, a game controller, which is provided for content control. The controller 70 may include an input means, such as one or more buttons, a touchpad, or a joystick. According to an example of the disclosure, the electronic apparatus 100 may receive the control signal corresponding to the user input, from a user input means provided to the electronic apparatus 100. According to an example of the disclosure, the electronic apparatus 100 may receive the control signal corresponding to the user input, from a smart device paired with the electronic apparatus 100 by Bluetooth communication or the like.

In operation 530, the electronic apparatus 100 may obtain a content output control signal corresponding to the obtained control signal, while transmitting the obtained control signal to the server computer 200 to allow the content to be processed based on the obtained control signal.

The electronic apparatus 100 may transmit the control signal corresponding to the user input to the server computer 200 to allow a remote processing module of the server computer 200 to perform operation processing on the control signal corresponding to the user input and thus a result screen to be provided. However, because it takes time to receive the result screen corresponding to the control signal from the server computer 200, and thus, feedback corresponding to the control signal may be late, the electronic apparatus 100 may quickly process the control signal through a local processing module in the electronic apparatus 100, while transmitting the control signal to the server computer 200.

The electronic apparatus 100 may obtain the content output control signal by processing the obtained control signal via the local processing module. The content output control signal may include at least one of an image output control signal for controlling an output of video data displayed on the display or an audio output control signal for controlling an output of audio data that is output to an audio outputter.

In operation S540, the electronic apparatus 100 may process and display the content based on the obtained content output control signal.

When the obtained content output control signal includes the image output control signal, the electronic apparatus 100 may process the video data displayed on the display, by referring to the image output control signal, and display the processed video data.

When the obtained content output control signal includes the audio output control signal, the electronic apparatus 100 may process the audio data that is output through the audio outputter, by referring to the audio output control signal, and display the processed audio data.

When the obtained content output control signal includes both the image output control signal and the audio output control signal, the electronic apparatus 100 may display the video data, which is processed according to the image output control signal, on the display and may output the audio data, which is processed according to the audio output control signal, through the audio outputter.

As such, because processing via the local processing module of the electronic apparatus 100 may produce a result more quickly than processing via the remote processing module of the server computer 200, the electronic apparatus 100 may more quickly provide feedback in response to the user input for controlling the content, by outputting the processing result from the local processing module before receiving the processing result by the remote processing module from the server computer 200.

Therefore, the user may experience the content with immersion by receiving the feedback, without the chance to experience the delay of the processing result from the server computer 200.

Hereinafter, a method of performing local processing inside an electronic apparatus according to a control signal corresponding to a user input is described with reference to FIGS. 6 and 7.

Figure 6:
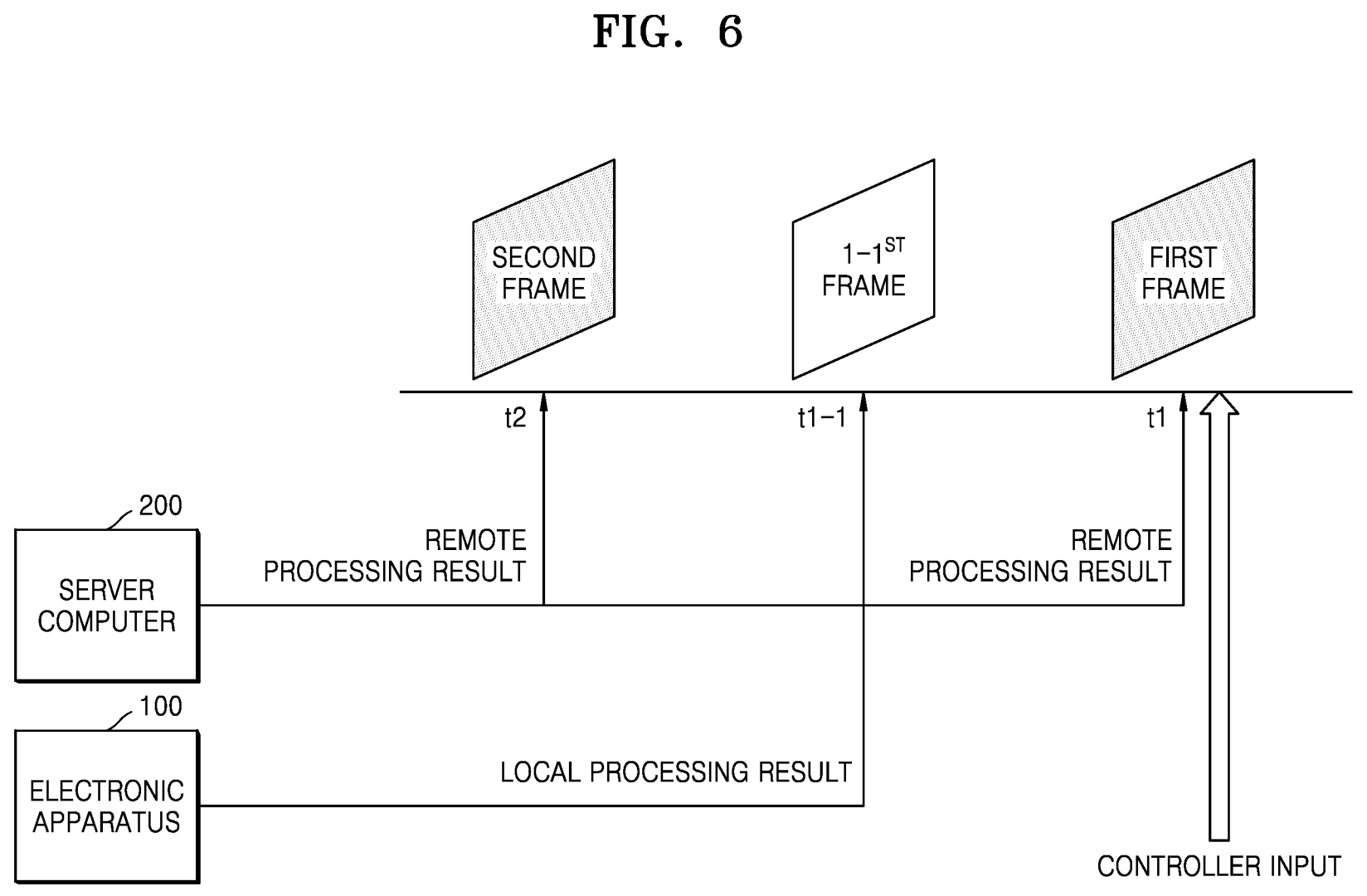

FIG. 6 illustrates an example of outputting a remote processing result and a local processing result, which are obtained by processing a control signal corresponding to a user input, according to an embodiment of the disclosure.

Referring to FIG. 6, at a time point t1, the electronic apparatus 100 may receive a frame, which is generated as a remote processing result, from the server computer 200 and display the frame. In addition, at the time point t1, the electronic apparatus 100 may receive a control signal corresponding to a user input for controlling content that is displayed. In this case, the electronic apparatus 100 may transmit the control signal corresponding to the user input to the server computer 200. A time point when a second frame, which is a remote processing result generated by processing the control signal, is received from the server computer 200 may be a time point t2, and thus, the electronic apparatus 100 may display the second frame received as the remote processing result only at the time point t2.

Because a time period from the time point t1 to the time point t2 may be considerably long, the electronic apparatus 100 may output a local processing result, which is generated inside the electronic apparatus 100 by directly processing the control signal, at a time point between the time point t1 and the time point t2. That is, the electronic apparatus 100 may output a 1-1st frame generated as a result of processing the control signal corresponding to the user input, at a time point t1-1. Although FIG. 6 illustrates an example of one frame, that is, only the 1-1st frame, as the local processing result, a frame that is output as a result of local processing between a first frame and a second frame, which are remote processing result frames, may include one or more frames.

As such, by outputting a result generated by local processing inside the electronic apparatus 100 between time points of outputting frames received from the server computer 200, a user may feel as if there is quick feedback. Hereinafter, how a local processing result frame, such as the 1-1st frame, is generated is described with reference to FIG. 7.

Figure 7:
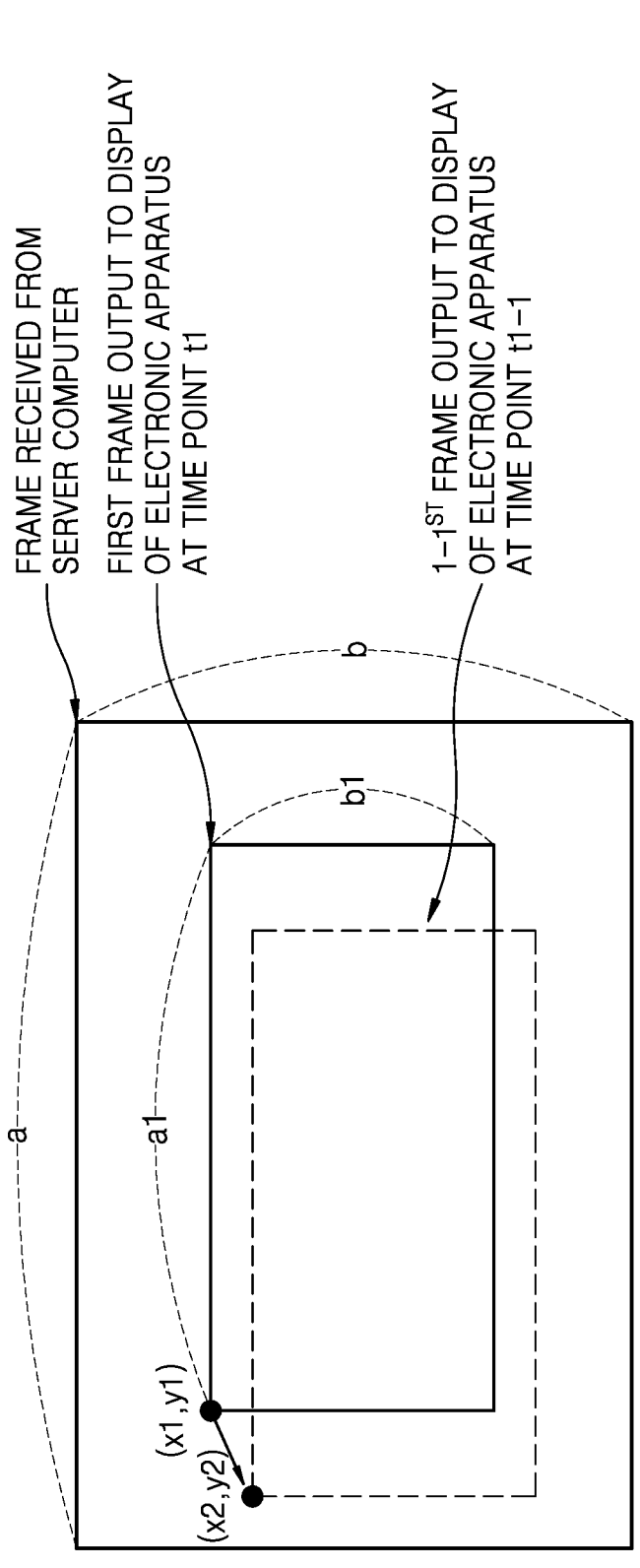
FIG. 7 is a reference diagram illustrating an example of a method, performed by an electronic apparatus, of generating a frame, which is a local processing result, based on a control signal corresponding to a user input, according to an embodiment of the disclosure.

FIG. 7 is a reference diagram illustrating a method, performed by the electronic apparatus 100, of generating a frame, which is a local processing result, based on a control signal corresponding to a user input, according to an embodiment of the disclosure.

Referring to FIG. 7, a frame, which is received from the server computer 200 by the electronic apparatus 100, is greater in size than a screen of a display of the electronic apparatus 100. That is, when the screen size of the display of the electronic apparatus 100 is a1*b1, the electronic apparatus 100 may receive, from the server computer 200, a frame of a size of a*b (a>a1, b>b1).

The electronic apparatus 100 may receive the frame of a greater size than the screen size of the display of the electronic apparatus 100 from the server computer 200, may crop a region from the received frame to fit the screen size of the display of the electronic apparatus 100, and may output the cropped region to the display.

While the electronic apparatus 100 may normally crop a region from a central portion of the frame received from the server computer 200 to output the cropped region to the display, when receiving the control signal corresponding to the user input, the electronic apparatus 100 may shift a region to be cropped from the frame and then crop the shifted region to output the cropped region, thereby providing a feedback effect corresponding to the user input. Referring to FIG. 7, at the time point t1, a first frame cropped from a region with a top-left starting point of (x1,y1) in the frame may be output. In addition, to provide a feedback effect according to the control signal corresponding to the user input received at the time point t1, the 1-1st frame, which is cropped from a region with a top-left starting point of (x2,y2) in the frame, may be output at the time point t1-1. As such, by shifting a region to be output to the display according to the user input, the user may recognize that a response to the user input appears to be instantly generated. For example, when the user pushes a left direction key button, by performing cropping after shifting a region to be cropped to the left side in response thereto, the user may be allowed to experience that feedback corresponding to the left direction key button appears to be generated. For example, when the user pushes a right direction key button, by performing cropping after shifting a region to be cropped to the right side in response thereto, the user may be allowed to experience that feedback corresponding to the right direction key button appears to be generated.

Figure 8:
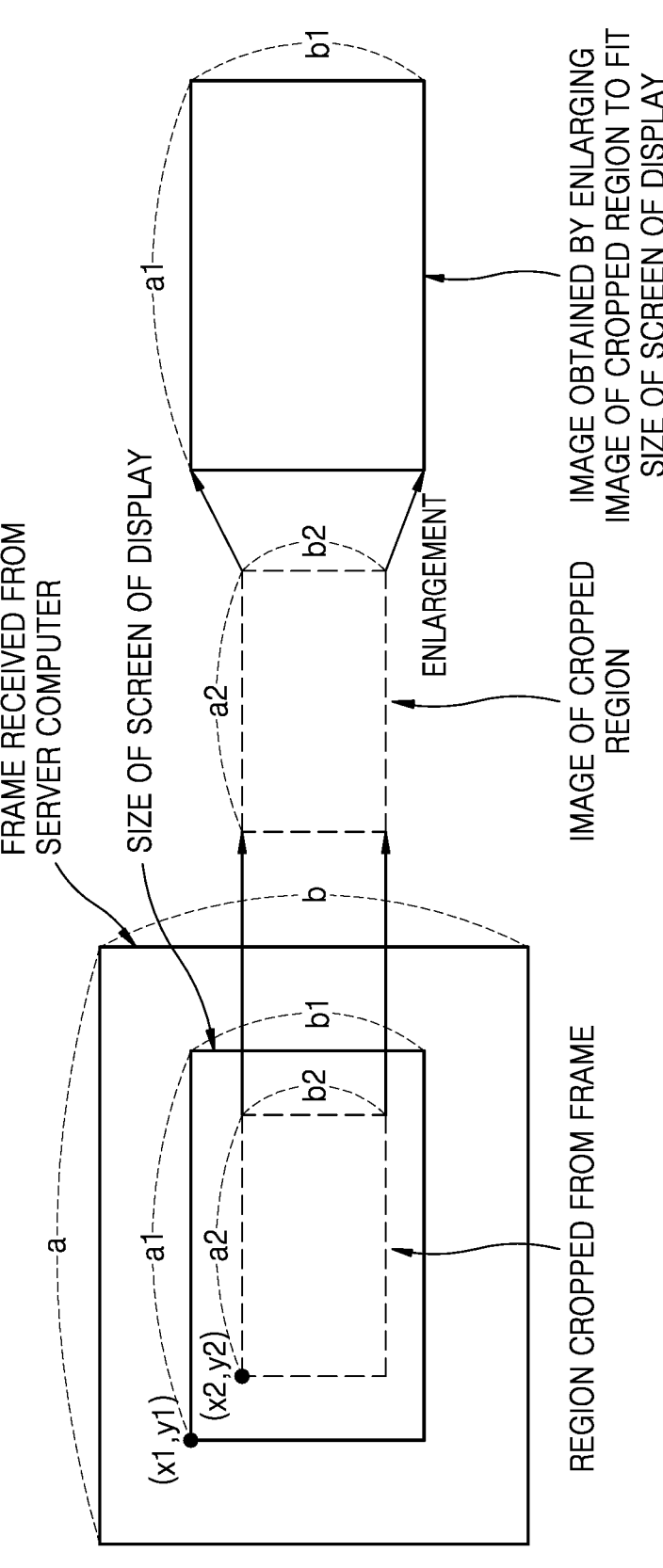
FIG. 8 is a reference diagram illustrating another example of a method, performed by an electronic apparatus, of generating a frame, which is a local processing result, based on a control signal corresponding to a user input, according to an embodiment of the disclosure.

FIG. 8 is a reference diagram illustrating another example of a method, performed by the electronic apparatus 100, of generating a frame, which is a local processing result, based on a control signal corresponding to a user input, according to an embodiment of the disclosure.

Referring to FIG. 8, a frame, which is received from the server computer 200 by the electronic apparatus 100, is greater in size than the screen of the display of the electronic apparatus 100. That is, when the screen size of the display of the electronic apparatus 100 is a1*b1, the electronic apparatus 100 may receive, from the server computer 200, a frame of a size of a*b (a>a1, b>b1).

The electronic apparatus 100 may receive the frame of a greater size than the screen size of the display of the electronic apparatus 100 from the server computer 200, may crop, from the received frame, a region reduced or enlarged as compared with the screen size of the display of the electronic apparatus 100, may enlarge or reduce an image of the cropped region again to fit the screen size of the display of the electronic apparatus 100, and may output the enlarged or reduced image to the display.

While the electronic apparatus 100 may normally crop a region of a preset size from the central portion of the frame received from the server computer 200 to output the cropped region to the display, when receiving the control signal corresponding to the user input, the electronic apparatus 100 may increase or reduce the size of a region to be cropped from the frame and then crop the region of an increased or reduced size to output the cropped region, thereby providing a feedback effect corresponding to the user input. Referring to FIG. 8, at the time point t1, a first frame cropped from a region with a top-left starting point of (x1,y1) in the frame and a preset size of a1*b1 may be output. In addition, to provide a feedback effect according to the control signal corresponding to the user input received at the time point t1, an image may be extracted from a region cropped to a reduced size of a2*b2 while having a top-left starting point of (x2,y2) in the frame, at the time point t1-1. In addition, to cause the image of a size of a2*b2 to fit the screen of the display, which has a size of a1*b1, the electronic apparatus 100 may enlarge the image and output the image to the display. As such, by enlarging the image extracted from the reduced-size region in the frame again, the display may finally display the enlarged image at the time point t1-1, as compared with the previous image, that is, the image displayed at the time point t1. For example, when the user pushes a forward key button, by reducing a region to be cropped in response thereto and enlarging and displaying the cropped region to fit the screen of the display, the user may be allowed to experience that feedback corresponding to the forward key button appears to be generated.

Figure 9:
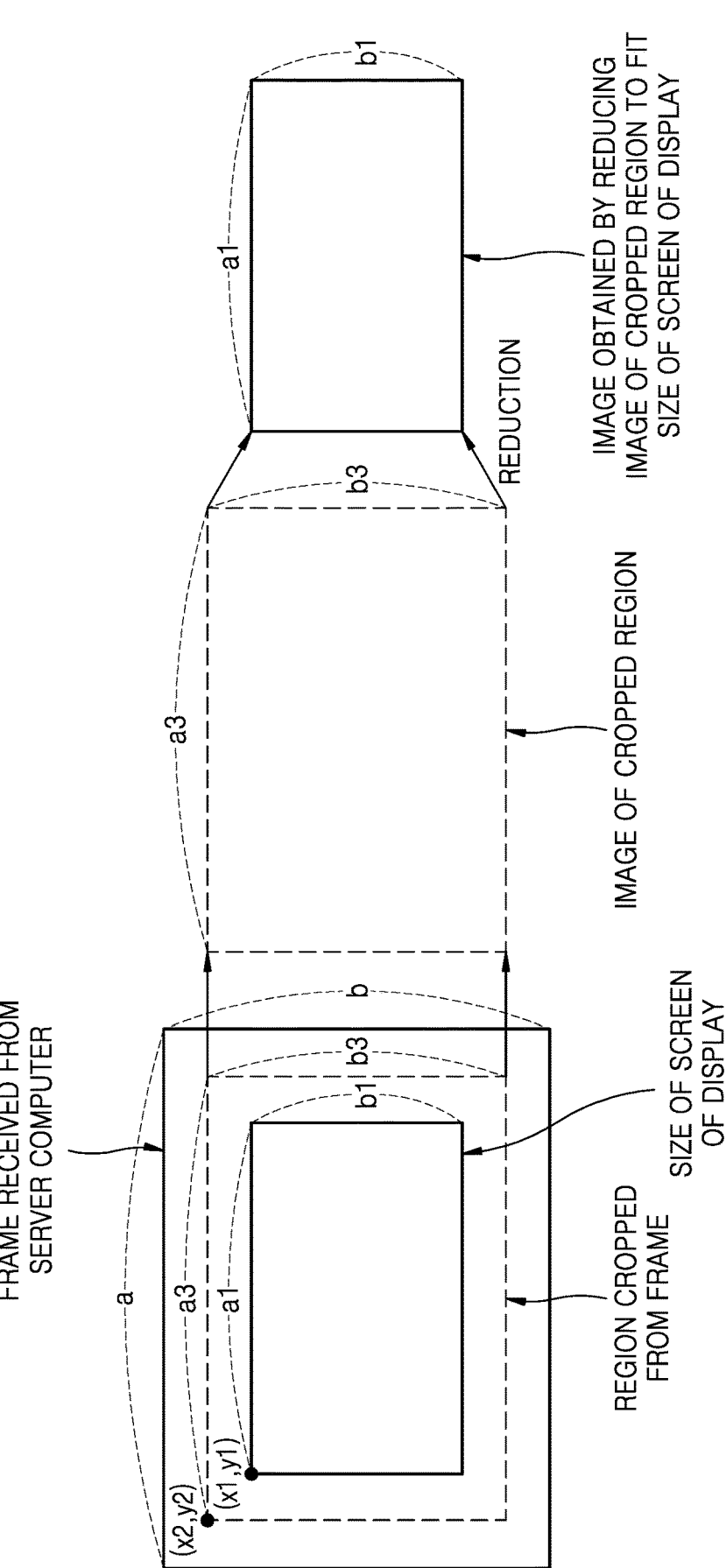
FIG. 9 is a reference diagram illustrating yet another example of a method, performed by an electronic apparatus, of generating a frame, which is a local processing result, based on a control signal corresponding to a user input, according to an embodiment of the disclosure.

FIG. 9 is a reference diagram illustrating yet another example of a method, performed by the electronic apparatus 100, of generating a frame, which is a local processing result, based on a control signal corresponding to a user input, according to an embodiment of the disclosure.

Referring to FIG. 9, a frame, which is received from the server computer 200 by the electronic apparatus 100, is greater in size than the screen of the display of the electronic apparatus 100. That is, when the screen size of the display of the electronic apparatus 100 is a1*b1, the electronic apparatus 100 may receive, from the server computer 200, a frame of a size of a*b (a>a1, b>b1).

The electronic apparatus 100 may receive the frame of a greater size than the screen size of the display of the electronic apparatus 100 from the server computer 200, may crop, from the received frame, a region enlarged as compared with the screen size of the display of the electronic apparatus 100, may reduce an image of the cropped region again to fit the screen size of the display of the electronic apparatus 100, and may output the image to the display.

While the electronic apparatus 100 may normally crop a region of a preset size from the central portion of the frame received from the server computer 200 to output the cropped region to the display, when receiving the control signal corresponding to the user input, the electronic apparatus 100 may increase the size of a region to be cropped from the frame and then crop the region of an increased size to output the cropped region, thereby providing a feedback effect corresponding to the user input. Referring to FIG. 9, at the time point t1, a first frame cropped from a region with a top-left starting point of (x1,y1) in the frame and a preset size of a1*b1 and may be output. In addition, to provide a feedback effect according to the control signal correspond- ing to the user input received at the time point t1, an image may be extracted from a region cropped to an increased size of a3*b3 while having a top-left starting point (x2,y2) in the frame. In addition, to cause the image of a size of a3*b3 to fit the screen of the display, which has a size of a1*b1, the electronic apparatus 100 may reduce the image and output the image to the display. As such, by reducing the image extracted from the increased-size region in the frame again, the display may finally display the reduced image at the time point t1−1, as compared with the previous image, that is, the image displayed at the time point t1. For example, when the user pushes a backward key button, by enlarging a region to be cropped in response thereto and reducing and displaying the cropped region to fit the screen of the display, the user may be allowed to experience that feedback corresponding to the backward key button appears to be generated.

Hereinafter, an example, in which an image output is controlled inside an electronic apparatus according to a control signal corresponding to a user input, is described with reference to FIGS. 10 to 16.

Figure 10:
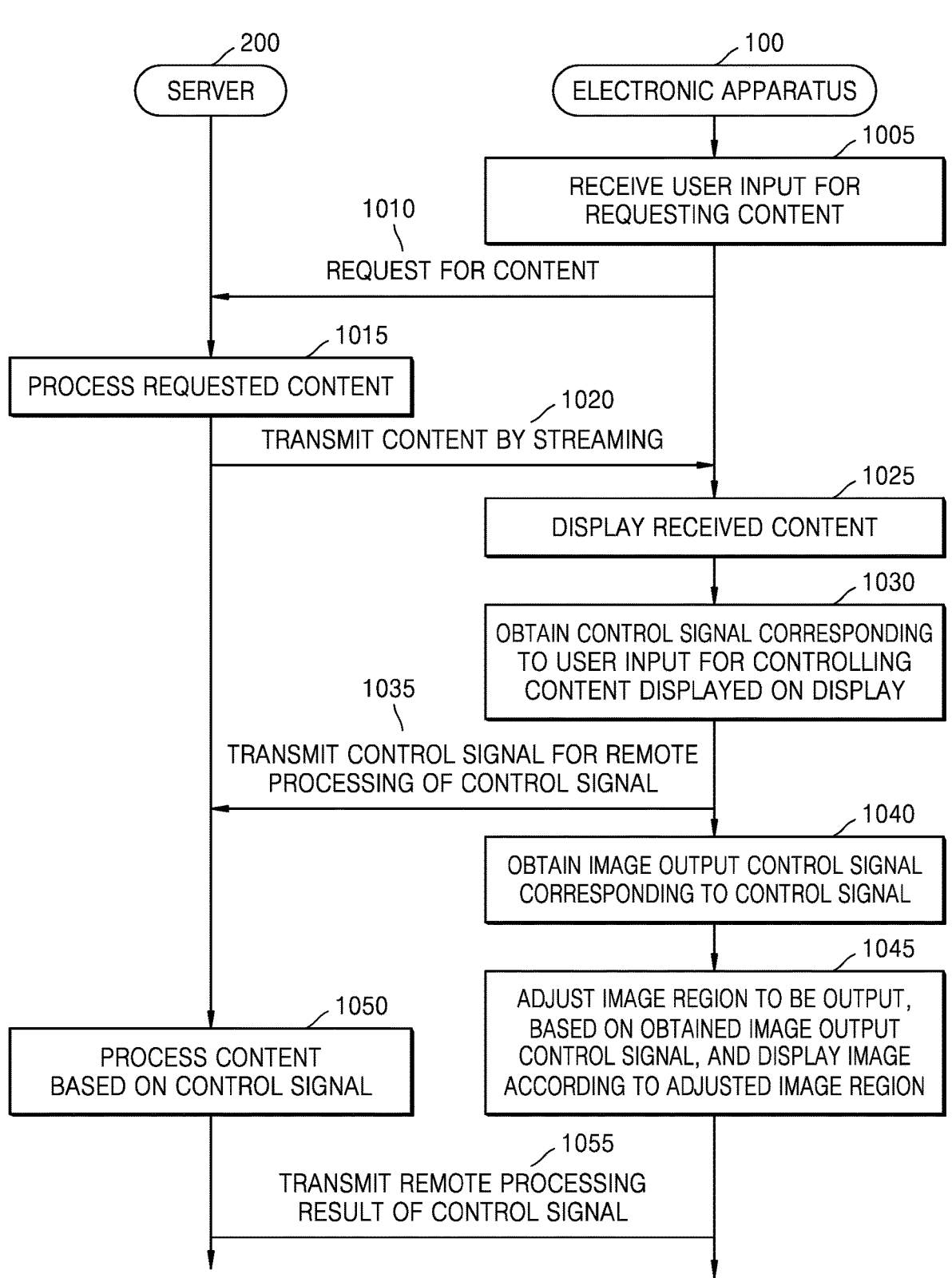
FIG. 10 is a flowchart illustrating an example of a process, performed by an electronic apparatus, of controlling an image output according to a control signal corresponding to a user input, according to an embodiment of the disclosure.

FIG. 10 is a flowchart illustrating an example of a process, performed by an electronic apparatus, of controlling an image output according to a control signal corresponding to a user input, according to an embodiment of the disclosure.

Referring to FIG. 10, in operation 1005, the electronic apparatus 100 may receive a user input for requesting to reproduce content.

In operation 1010, the electronic apparatus 100 may transmit, to the server computer 200, the user request for the content.

In operation 1015, the server computer 200 may process the requested content, and in operation 1020, the server computer 200 may transmit the processed content to the electronic apparatus 100 by using streaming.

In operation 1025, the electronic apparatus 100 may display the content received from the server computer 200.

In operation 1030, the electronic apparatus 100 may receive a control signal corresponding to a user input for controlling the content displayed on a display.

In operation 1035, the electronic apparatus 100 may transmit the control signal corresponding to the user input for controlling the content to the server computer 200 to cause the server computer 200 to process the control signal.

In operation 1040, to perform local processing on the control signal corresponding to the user input for controlling the content, the electronic apparatus 100 may obtain an image output control signal corresponding to the control signal. According to an example of the disclosure, the electronic apparatus 100 may obtain the image output con- trol signal by referring to a mapping table in which control signals corresponding to user inputs are respectively mapped to image output control signals.

In operation 1045, the electronic apparatus 100 may adjust an image region to be output, based on the obtained image output control signal, and may display an image according to the adjusted image region.

According to an embodiment of the disclosure, the elec- tronic apparatus 100 may shift the image region to be output, based on the obtained image output control signal, and may display an image after obtaining the image from the shifted image region. For example, the electronic apparatus 100 may shift a region, from which an image to be output is to be cropped, to the left, right, upward, or downward side, based on the obtained image output control signal, and may crop the image from the shifted region to display the cropped image.

According to an embodiment of the disclosure, the elec- tronic apparatus 100 may crop a region larger than the image region to be output or a region smaller than the image region to be output, based on the obtained image output control signal, and may display an image of the cropped region. For example, when an image is enlarged based on the image output control signal, the electronic apparatus 100 may crop a region less in size than the screen of the display and enlarge an image of the cropped region to a size as large as the screen size of the display, thereby providing an effect of enlarging the image. For example, when an image is reduced based on the image output control signal, the electronic apparatus 100 may crop a region greater in size than the screen of the display and reduce an image of the cropped region to a size as small as the size of the display screen, thereby providing an effect of reducing the image.

In operation 1050, the server computer 200 may perform remote processing to process the content according to a control signal from the electronic apparatus 100.

In operation 1055, the server computer 200 may transmit, to the electronic apparatus 100, a remote processing result of the content according to the control signal.

Figure 11:
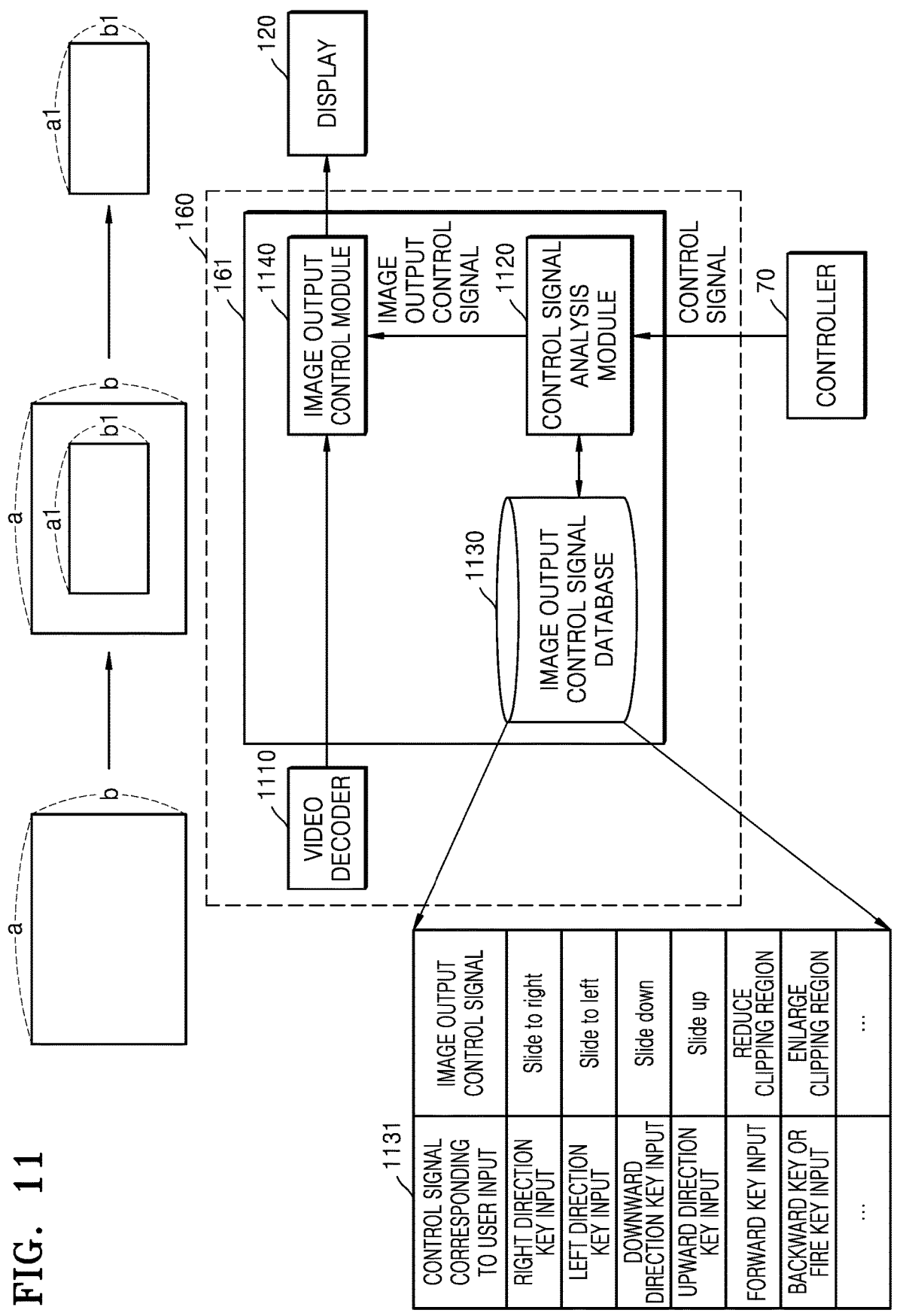
FIG. 11 illustrates an example of a local processing module, which controls an image output according to a control signal corresponding to a user input, in an electronic apparatus, according to an embodiment of the disclosure.

FIG. 11 illustrates an example of a local processing module, which controls an image output according to a control signal corresponding to a user input, in an electronic apparatus, according to an embodiment of the disclosure.

Referring to FIG. 11, the local processing module 161, which controls the image output according to the control signal corresponding to the user input, may be included in the video processing unit 160. It is only an example that the local processing module 161 is included in the video pro- cessing unit 160, and the local processing module 161 may be provided outside the video processing unit 160.

According to an embodiment of the disclosure, the video processing unit 160 may include a video decoder 1110 and the local processing module 161.

The video decoder 1110 may decode a frame of content, which is received from the server computer 200 and trans- ferred to the video decoder 1110, and may transfer the decoded frame to the local processing module 161. The frame, which is received from the server computer 200 and decoded by the video decoder 1110, may have a size of a*b.

When the electronic apparatus 100 receives, from the controller 70, the control signal corresponding to the user input for controlling the content displayed on the display 120, the electronic apparatus 100 may control the received control signal to be transferred to the local processing module 161. The local processing module 161 may include a control signal analysis module 1120, an image output control signal database 1130, and an image output control module 1140.

The control signal analysis module 1120 may receive, from the controller 70, the control signal corresponding to the user input and may analyze the received control signal. By analyzing the received control signal, the control signal analysis module 1120 may obtain an image output control signal, which corresponds to the received control signal, by referring to the image output control signal database 1130.

The image output control signal database 1130 may include a mapping table 1131, in which control signals corresponding to user inputs for controlling content are respectively mapped to image output control signals corre- sponding to such control signals.

Referring to FIG. 11, the mapping table 1131 may include a pair of a control signal corresponding to a user input and an image output control signal. Specifically, in the mapping table 1131, "slide to right" is mapped as an image output control signal for a control signal corresponding to a right direction key input, "slide to left" is mapped as an image output control signal for a control signal corresponding to a left direction key input, "slide down" is mapped as an image output control signal for a control signal corresponding to a downward direction key input, "slide up" is mapped as an image output control signal for a control signal corresponding to an upward direction key input, "reduce the clipping region" is mapped as an image output control signal for a control signal corresponding to a forward key input, and "enlarge the clipping region" is mapped as an image output control signal for a control signal corresponding to a backward or fire key input.

When the received control signal is the control signal corresponding to the right direction key input, the control signal analysis module 1120 may obtain "slide to right" as the image output control signal mapped to the control signal corresponding to the right direction key input, by referring to the image output control signal database 1130, and may transfer the image output control signal "slide to right" to the image output control module 1140.

The image output control module 1140 may perform frame processing on the frame received from the video decoder 1110, according to the image output control signal that is output from the control signal analysis module 1120, and may output the processed frame to the display 120. The image output control module 1140 may receive the frame of a size of a*b from the video decoder 1110, may crop a region from the received frame, based on the image output control signal, and may transfer the cropped region to the display 120. For example, when the image output control module 1140 receives the image output control signal "slide to right", in cropping a region of a size of a1*b1, which is the screen size of the display, from the frame of a size of a*b, the image output control module 1140 may shift the region to be cropped to the right side and crop an image from the shifted region. As such, by shifting the region to be cropped to the right side, feedback corresponding to the right direction key input may be quickly provided to the user.

The display 120 may receive, from the image output control module 1140, the image of the cropped region, that is, the image of a size of a1*b1, which is the screen size of the display, and may display the image on the screen.

Figure 12:
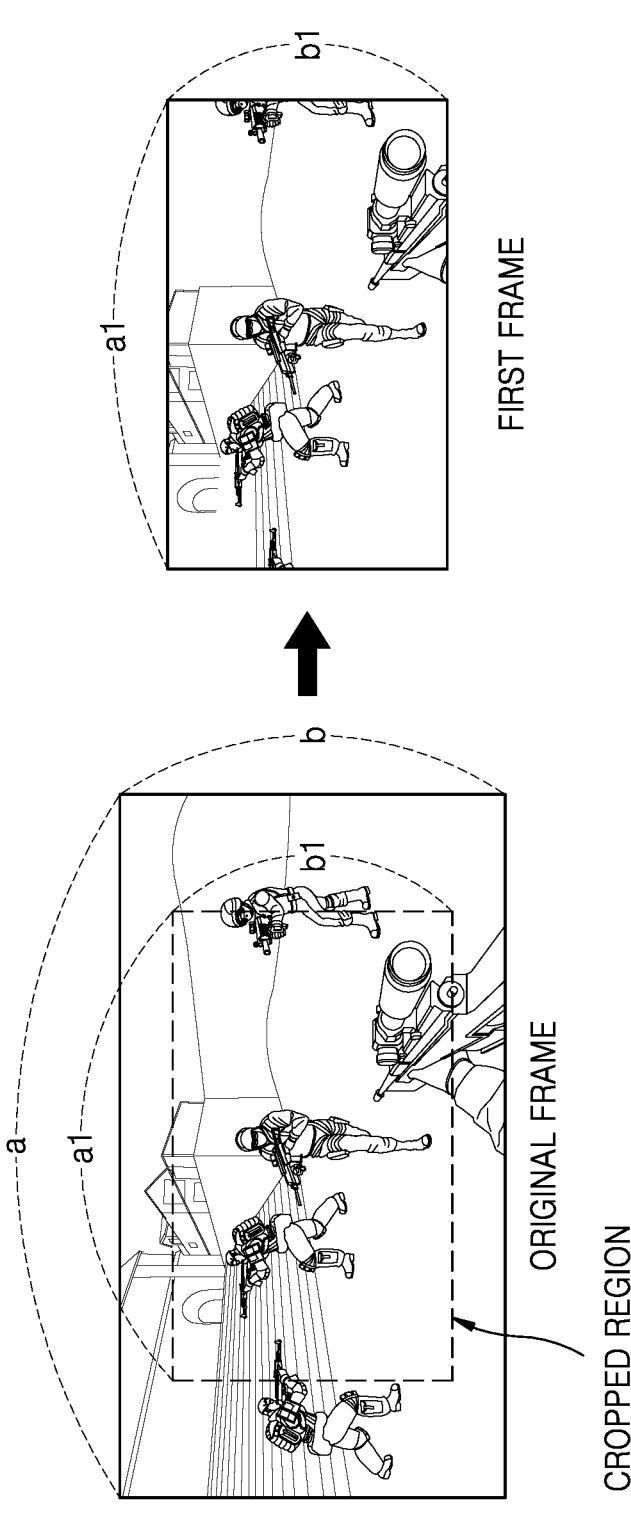
FIG. 12 is a reference diagram illustrating respective sizes of a frame received from a server computer and a frame displayed on a display in an electronic apparatus, according to an embodiment of the disclosure.

FIG. 12 is a reference diagram illustrating respective sizes of a frame received from the server computer 200 and a frame displayed on the display of the electronic apparatus 100, according to an embodiment of the disclosure.

Referring to FIG. 12, the electronic apparatus 100 may receive, from the server computer 200, an original frame of a size of a*b, which is greater than the size, a1*b1, of the screen of the display of the electronic apparatus 100. Then, the electronic apparatus 100 may crop a region from the original frame of a size, which is greater than the screen size of the display of the electronic apparatus 100, may determine the cropped region to be a region to be output to the screen of the display, and may output a first frame (of a size of a1*b1) corresponding to the determined region.

While the electronic apparatus 100 normally crops a central region from the original frame received from the server computer 200 to output the cropped region to the display, when it is intended to quickly display a feedback effect in response to a user input for controlling content, the electronic apparatus 100 may select a region to be cropped from the frame after shifting the region to be cropped, appropriately for the intended feedback effect, and may output an image of the selected region to the display, thereby instantly providing the feedback effect corresponding to the user input. As such, to provide the feedback effect, because the region to be cropped needs to be shifted and there is a need for a space to shift the region to be cropped, the electronic apparatus 100 may receive the original frame that is greater in size than the screen of the display, according to an agreement with the server computer 200.

Figure 13:
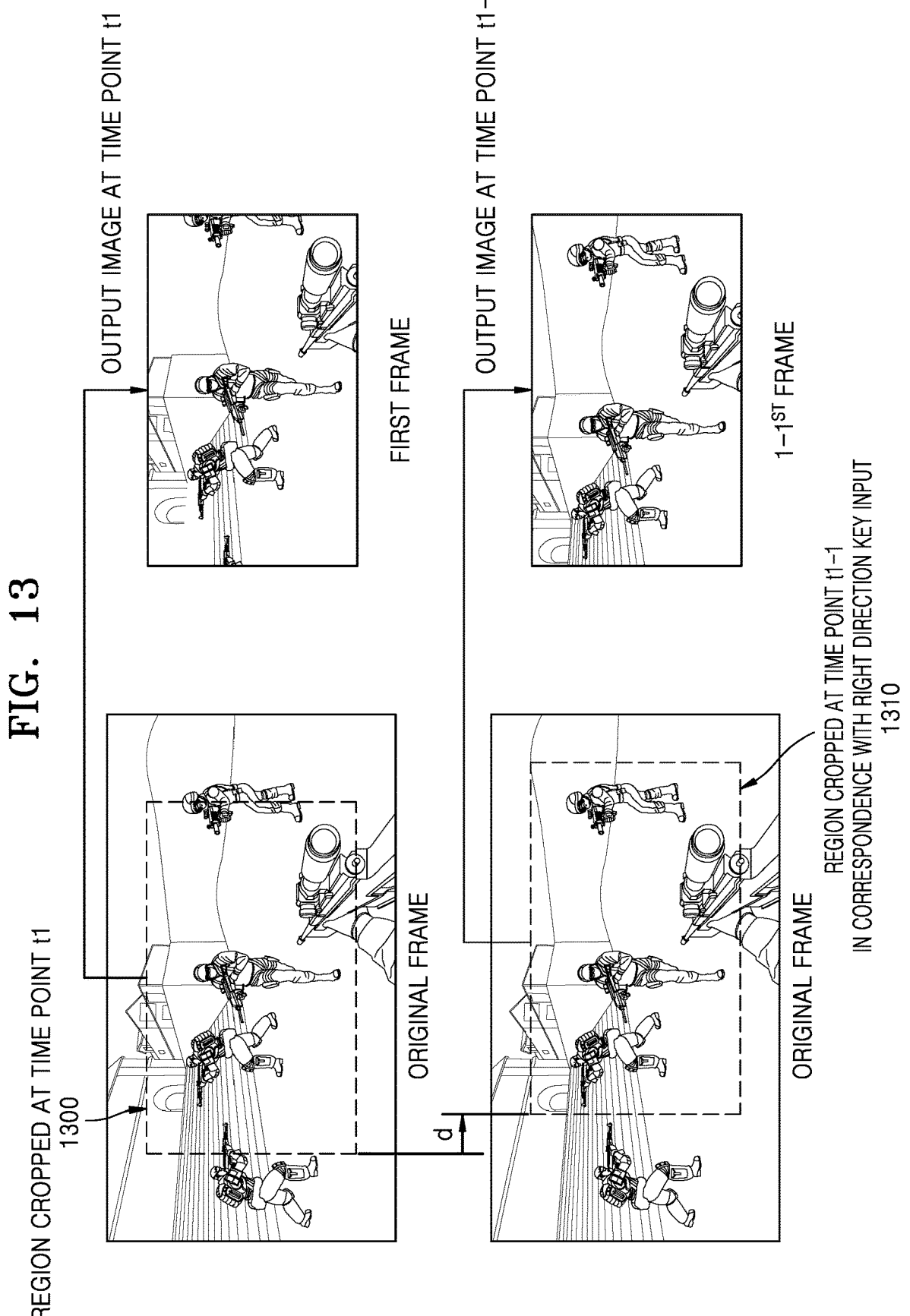
FIG. 13 is a reference diagram illustrating image output control according to a right direction key input, according to an embodiment of the disclosure.

FIG. 13 is a reference diagram illustrating image output control according to a right direction key input, according to an embodiment of the disclosure.

Referring to FIG. 13, the electronic apparatus 100 may receive, from the server computer 200, an original frame of a size of a*b, which is greater than the size, a1*b1, of the screen of the display of the electronic apparatus 100. Then, the electronic apparatus 100 may crop a region 1300 from the original frame of a size, which is greater than the screen size of the display of the electronic apparatus 100, may determine the cropped region 1300 to be a region to be output to the screen of the display, and may output a first frame (of a size of a1*b1) corresponding to the determined region, at the time point t1.

In addition, when the electronic apparatus 100 receives, from a controller at the time point t1, a control signal corresponding to a right direction key input, the electronic apparatus 100 may obtain "slide to right" as an image output control signal corresponding to the right direction key input, from the mapping table 1131 of the image output control signal database 1130. The electronic apparatus 100 may shift a region, which is to be cropped from the original frame, to the right side by as much as a distance d from the existing region 1300, according to "slide to right" that is an image output control signal, and may determine a shifted region 1310 to be the region to be cropped. In addition, the electronic apparatus 100 may crop the shifted region 1310 and output a 1-1$^{st}$ frame corresponding to an image of the cropped region.

As such, even before the electronic apparatus 100 transmits the right direction key input to the server computer 200 and then receives, from the server computer 200, a remote processing result for the right direction key input, a result of performing processing inside the electronic apparatus 100 instantly in response to the right direction key input may be provided to a user, thereby providing quick feedback to the user.

Figure 14:
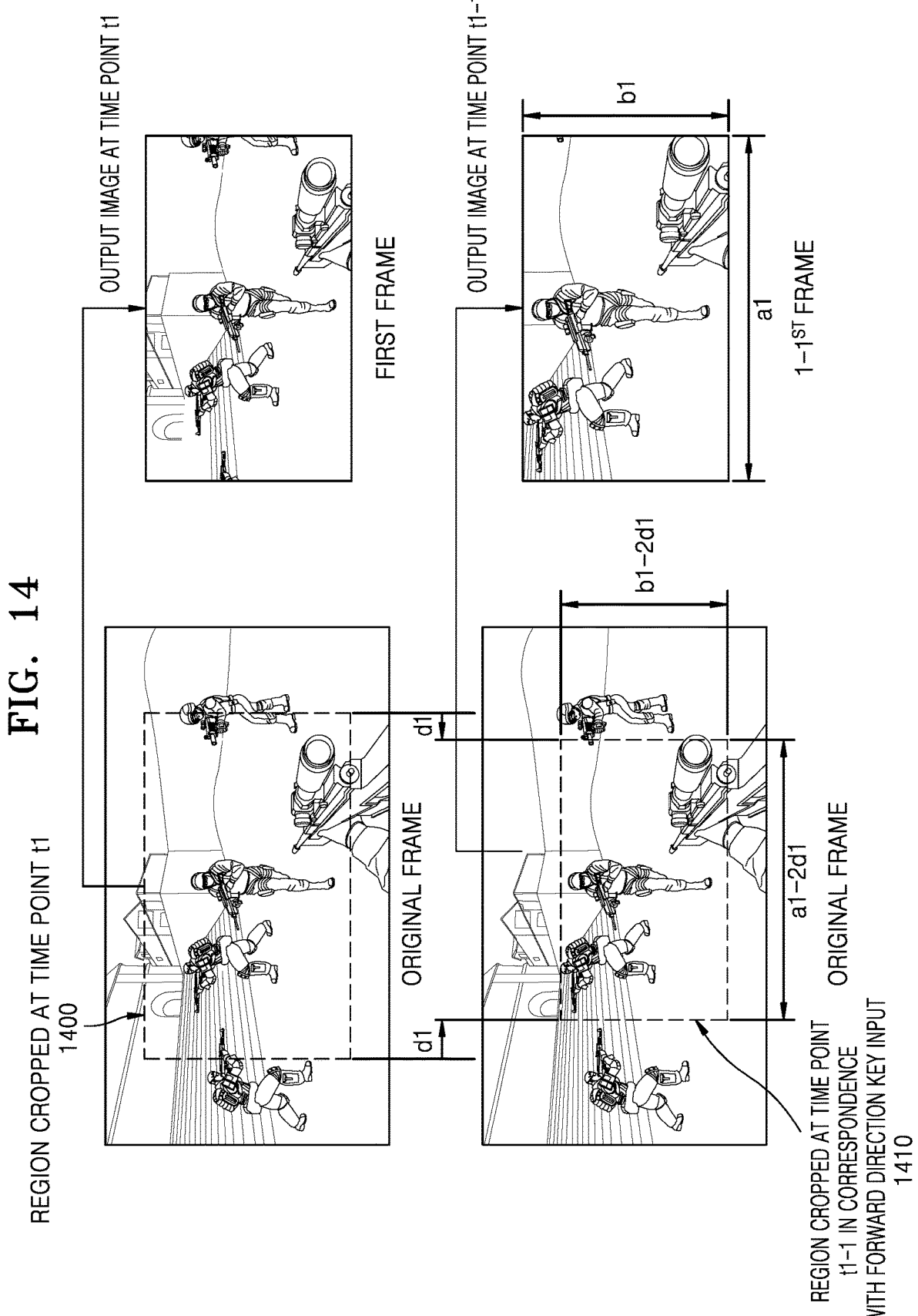
FIG. 14 is a reference diagram illustrating image output control according to a forward direction key input, according to an embodiment of the disclosure.

FIG. 14 is a reference diagram illustrating image output control according to a forward direction key input, according to an embodiment of the disclosure.

Referring to FIG. 14, the electronic apparatus 100 may receive, from the server computer 200, an original frame of a size of a*b, which is greater than the size, a1*b1, of the screen of the display of the electronic apparatus 100. Then, the electronic apparatus 100 may crop a region 1400 from the original frame of a size greater than the screen size of the display of the electronic apparatus 100 may determine the cropped region 1400 to be a region to be output to the screen of the display, and may output a first frame (of a size of a1*b1) corresponding to the determined region, at the time point t1.

In addition, when the electronic apparatus 100 receives, from a controller at the time point t1, a control signal corresponding to a forward direction key input, the electronic apparatus 100 may obtain "reduce the clipping region" as an image output control signal corresponding to the forward direction key input, from the mapping table 1131 of the image output control signal database 1130. The electronic apparatus 100 may reduce a region, which is to be cropped from the original frame, to a smaller size than the existing region 1400 for cropping, according to "reduce the clipping region" that is an image output control signal, and may determine a reduced region 1410 to be the region to be cropped. For example, the reduced region 1410 may be determined to be a region reduced by as much as d1 each from upper, lower, left, and right edges of the existing region 1400 for cropping. Therefore, the reduced and cropped region may have a size of a1−2d1*b1−2d1. The electronic apparatus 100 may enlarge the reduced and cropped region to a size of a1*b1, which is the screen size of the display, and then, may output a 1-1$^{st}$ frame corresponding to an enlarged image.

As such, even before the electronic apparatus 100 transmits the forward direction key input to the server computer 200 and then receives, from the server computer 200, a remote processing result for the forward direction key input, a result of performing processing inside the electronic apparatus 100 instantly in response to the forward direction key input, that is, a 1-1$^{st}$ frame having an enlarged image as compared with the first frame, may be provided to a user, and thus, the user may be provided with feedback as if a command to move forward is processed according to the forward direction key input.

Figure 15:
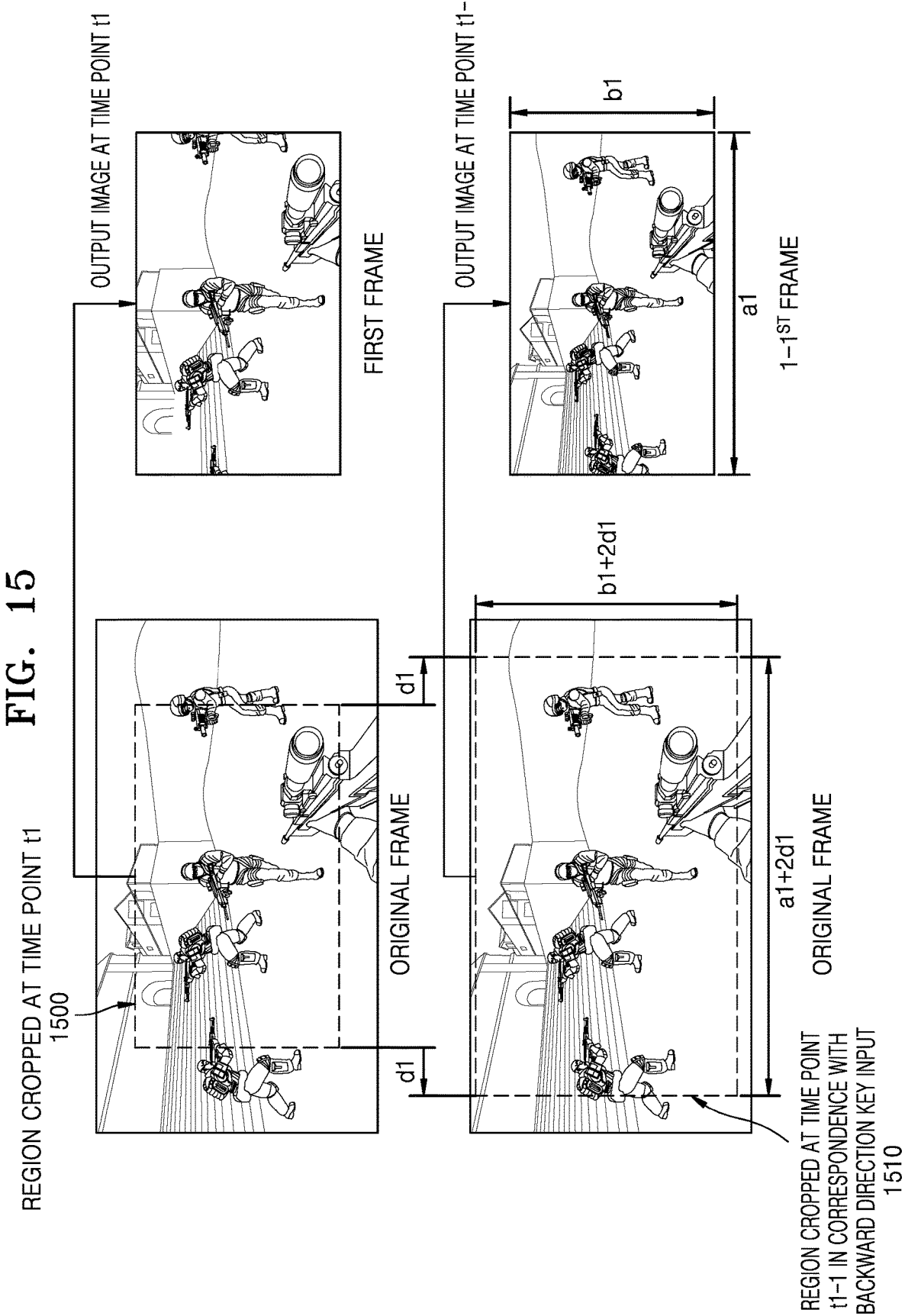
FIG. 15 is a reference diagram illustrating image output control according to a backward direction key input, according to an embodiment of the disclosure.

FIG. 15 is a reference diagram illustrating image output control according to a backward direction key input, according to an embodiment of the disclosure.

Referring to FIG. 15, the electronic apparatus 100 may receive, from the server computer 200, an original frame of a size of a*b, which is greater than the size, a1*b1, of the screen of the display of the electronic apparatus 100. Then, the electronic apparatus 100 may crop a region 1500 from the original frame of a size greater than the screen size of the display of the electronic apparatus 100 may determine the cropped region 1500 to be a region to be output to the screen of the display, and may output a first frame (of a size of a1*b1) corresponding to the determined region, at the time point t1.

In addition, when the electronic apparatus 100 receives, from a controller at the time point t1, a control signal corresponding to a backward direction key input, the electronic apparatus 100 may obtain "enlarge the clipping region" as an image output control signal corresponding to the backward direction key input, from the mapping table 1131 of the image output control signal database 1130. The electronic apparatus 100 may enlarge a region, which is to be cropped from the original frame, to a larger size than the existing region 1500 for cropping, according to "enlarge the clipping region" that is an image output control signal, and may determine an enlarged region 1510 to be the region to be cropped. For example, the enlarged region 1510 may be determined to be a region enlarged by as much as d1 each from upper, lower, left, and right edges of the existing region 1500 for cropping. Therefore, the enlarged and cropped region may have a size of a1+2d1*b1+2d1. The electronic apparatus 100 may reduce the enlarged and cropped region to a size of a1*b1, which is the screen size of the display, and then, may output a 1-1$^{st}$ frame corresponding to a reduced image.

As such, even before the electronic apparatus 100 transmits the backward direction key input to the server computer 200 and then receives, from the server computer 200, a remote processing result for the backward direction key input, a result of performing processing inside the electronic apparatus 100 instantly in response to the backward direction key input, that is, a 1-1$^{st}$ frame having a reduced image as compared with the first frame, may be provided to a user, and thus, the user may be provided with feedback as if a command to move backward is processed according to the backward direction key input.

Figure 16:
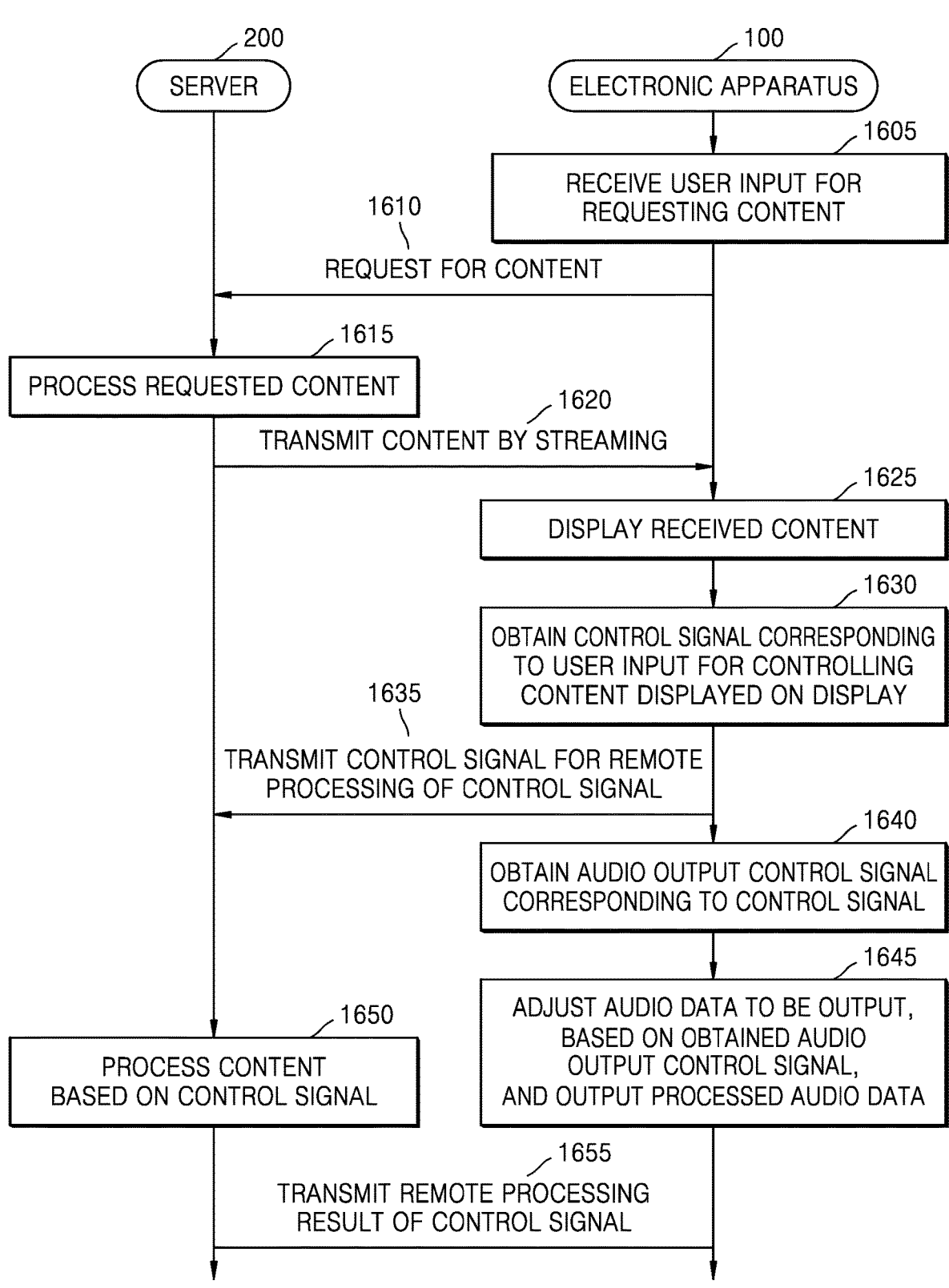
FIG. 16 is a flowchart illustrating an example of a process, performed by an electronic apparatus, of controlling an image output according to a control signal corresponding to a user input, according to an embodiment of the disclosure.

FIG. 16 is a flowchart illustrating an example of a process, performed by an electronic apparatus, of controlling an image output according to a control signal corresponding to a user input, according to an embodiment of the disclosure.

Referring to FIG. 16, in operation 1605, the electronic apparatus 100 may receive a user input for requesting to reproduce content.

In operation 1610, the electronic apparatus 100 may transmit, to the server computer 200, the user request for the content.

In operation 1615, the server computer 200 may process the requested content, and in operation 1620, the server computer 200 may transmit the processed content to the electronic apparatus 100 by using streaming.

In operation 1625, the electronic apparatus 100 may display the content received from the server computer 200.

In operation 1630, the electronic apparatus 100 may receive a control signal corresponding to a user input for controlling the content displayed on a display.

In operation 1635, for the server computer 200 to process the control signal corresponding to the user input for controlling the content, the electronic apparatus 100 may transmit the control signal to the server computer 200.

In operation 1640, for local processing of the control signal corresponding to the user input for controlling the content, the electronic apparatus 100 may obtain an audio output control signal corresponding to the control signal. According to an example of the disclosure, the electronic apparatus 100 may obtain the audio output control signal by referring to a mapping table in which control signals corresponding to user inputs are respectively mapped to audio output control signals.

In operation 1645, the electronic apparatus 100 may adjust audio data to be output, based on the obtained audio output control signal, and may output the adjusted audio data. The audio output control signal may include a parameter control signal for controlling an adjustment of a parameter of the audio data, which is received from the server computer 200, or a sound effect control signal for controlling a sound effect to be mixed with the audio data received from the server computer 200.

According to an embodiment of the disclosure, when the obtained audio output control signal includes the parameter control signal, the electronic apparatus 100 may process the audio data by adjusting the parameter of the audio data received from the server computer 200 according to the parameter control signal and may output the processed audio data.

According to an embodiment of the disclosure, when the obtained audio output control signal includes the sound effect control signal, the electronic apparatus 100 may generate a sound effect according to the sound effect control signal, may mix the generated sound effect with the audio data received from the server computer 200, and may output the mixed audio data.

In operation 1650, the server computer 200 may perform remote processing for processing the content according to the control signal from the electronic apparatus 100.

In operation 1655, the server computer 200 may transmit, to the electronic apparatus 100, a remote processing result of the content according to the control signal. FIG. 17 illustrates an example of a local processing module, which controls an audio output according to a control signal corresponding to a user input, in an electronic apparatus, according to an embodiment of the disclosure.

Referring to FIG. 17, a local processing module 1700, which controls an audio output according to a control signal corresponding to a user input, may be included in the audio processing unit 170. It is only an example that the local processing module 1700 is included in the audio processing unit 170, and the local processing module 1700 may be provided outside the audio processing unit 170.

According to an embodiment of the disclosure, the audio processing unit 170 may include an audio decoder 171 and the local processing module 1700.

The audio decoder 171 may decode audio data, which is received from the server computer 200 and transferred to the audio decoder 171, and may transfer a decoded frame to the local processing module 1700.

When the electronic apparatus 100 receives, from the controller 70, a control signal corresponding to a user input for controlling content displayed on the display 120, the electronic apparatus 100 may control the received control signal to be transferred to the local processing module 1700. The local processing module 1700 may include a control signal analysis module 1710, an audio output control signal database 1720, and an audio output control module 1730.

The control signal analysis module 1710 may receive the control signal corresponding to the user input and may analyze the received control signal. By analyzing the received control signal, the control signal analysis module 1710 may obtain an audio output control signal corresponding to the received control signal by referring to the audio output control signal database 1720.

The audio output control signal database 1720 may include a mapping table 1721 in which control signals corresponding to user inputs for controlling content are respectively mapped to audio output control signals corresponding to such control signals.

Referring to FIG. 17, the mapping table 1721 may include a pair of a control signal corresponding to a user input and an audio output control signal. Specifically, in the mapping table 1721, "first effect sound control signal/first audio parameter control signal" is mapped as an audio output control signal for a control signal corresponding to a right direction key input, "second effect sound control signal/second audio parameter control signal" is mapped as an audio output control signal for a control signal corresponding to a left direction key input, "third effect sound control signal/third audio parameter control signal" is mapped as an audio output control signal for a control signal corresponding to a downward direction key input, "fourth effect sound control signal/fourth audio parameter control signal" is mapped as an audio output control signal for a control signal corresponding to an upward direction key input, "fifth effect sound control signal/fifth audio parameter control signal" is mapped as an audio output control signal for a control signal corresponding to a forward direction key input, and "sixth effect sound control signal/sixth audio parameter control signal" is mapped as an audio output control signal for a control signal corresponding to a backward direction key input. The audio output control signal may include at least one of the first effect sound control signal and the first audio parameter control signal.

When the received control signal is the control signal corresponding to the right direction key input, the control signal analysis module 1710 may obtain "first effect sound control signal/first audio parameter control signal" as the audio output control signal mapped to the control signal corresponding to the right direction key input by referring to the audio output control signal database 1720, and may transfer, to the audio output control module 1730, the audio output control signal "first effect sound control signal/first audio parameter control signal".

The audio output control module 1730 may process the frame received from the audio decoder 171, according to the audio output control signal that is output from the control signal analysis module 1710, and may output the processed frame to the audio outputter 180. The audio output control module 1730 may receive "first effect sound control signal/first audio parameter control signal" as the audio output control signal mapped to the control signal corresponding to the right direction key input, may generate an effect sound according to the first effect sound control signal when the first effect sound control signal is included in the audio output control signal, may mix the generated effect sound with the audio data received from the audio decoder 171, and may output the mixed audio data to the audio outputter 180. When the first audio parameter control signal is included in the audio output control signal, the audio output control module 1730 may parameter-adjust the audio data received from the audio decoder 171, according to the first audio parameter control signal, and may output the parameter-adjusted audio data to the audio outputter 180. The audio parameter may include, for example, a volume or the like.

The audio outputter 180 may receive and output the audio data that is output from the audio output control module 1730.

Some embodiments of the disclosure may be implemented in the form of a recording medium including instructions executable by a computer, such as a program module executed by a computer. A computer-readable medium may be any available medium accessible by a computer and may include volatile and non-volatile media and separable and non-separable media. In addition, the computer-readable medium may include a computer storage medium. The computer storage medium includes volatile and non-volatile media and separable and non-separable media, which are implemented by any method or technique for storing information such as computer-readable instructions, data structures, program modules, or other data.

The disclosed embodiments of the disclosure may be implemented by software (S/W) programs including instructions stored in computer-readable storage media.

The computer is a device capable of calling stored instructions from a storage medium and operating according to the disclosed embodiments of disclosure, based on the called instructions, and may include an electronic apparatus according to the disclosed embodiments of the disclosure.

The computer-readable storage media may be provided in the form of non-transitory storage media. Herein, the term "non-transitory" only means that storage media do not include signals and are tangible, whether data is semi-permanently or temporarily stored in the storage media.

In addition, a control method according to the disclosed embodiments of the disclosure may be provided while included in a computer program product. The computer program product may be traded as merchandise between a seller and a purchaser.

The computer program product may include an S/W program and a computer-readable storage medium in which the S/W program is stored. For example, the computer program product may include merchandise (for example, a downloadable application) in the form of an S/W program electronically distributed through a manufacturer of a device or through an electronic market (for example, Google Play Store, or App Store). For electronic distribution, at least a portion of the S/W program may be stored in a storage medium or be temporarily generated. In this case, the storage medium may be a storage medium of a server of a manufacturer, a server of an electronic market, or a relay server temporarily storing the S/W program.

In a system including a server and a device, the computer program product may include a storage medium of the server or a storage medium of the device. Alternatively, when there is a third device (for example, a smartphone) communicatively connected to the server or the device, the computer program product may include a storage medium of the third device. Alternatively, the computer program product may include the S/W program itself, which is transmitted from the server to the device or the third device or transmitted from the third device to the device.

In this case, one of the server, the device, and the third device may execute the computer program product, thereby performing a method according to the disclosed embodiments of the disclosure. Alternatively, two or more of the server, the device, and the third device may execute the computer program product and thus dispersively perform a method according to the disclosed embodiments of the disclosure.

For example, the server (for example, a cloud server, an artificial intelligence server, or the like) may execute the computer program product stored in the server, thereby controlling the device, which is communicatively connected to the server, to perform a method according to the disclosed embodiments of the disclosure.

As another example, the third device may execute the computer program product, thereby controlling the device, which is communicatively connected to the third device, to perform a method according to the disclosed embodiments of the disclosure. When the third device executes the computer program product, the third device may download the computer program product from the server and execute the downloaded computer program product. Alternatively, the third device may perform the method according to the disclosed embodiments of the disclosure by executing the computer program product provided in a pre-loaded state.

In addition, the term such as " . . . unit" or " . . . portion" used herein may refer to a hardware component, such as a processor or a circuit, and/or a software component executed by the hardware component, such as a processor.

The above descriptions of the disclosure are provided for illustration, and it will be understood by those of ordinary skill in the art that the disclosure may be embodied in different ways without departing from the spirit and scope of the disclosure. Therefore, it should be understood that the foregoing embodiments are provided for illustrative purposes in all aspects and are not to be construed in any way as limiting the disclosure. For example, each component described as being of a single type may be implemented in a distributed manner, and similarly, components described as being distributed may be implemented in a combined form.

It should be understood that the scope of the disclosure is defined by the following claims rather than by the above detailed description, and that any changes or modifications derived from the meaning and scope of the claims and equivalents thereof should be construed as falling within the scope of the disclosure.

What is claimed is:

1. An electronic apparatus comprising:
a communication interface;

a memory storing one or more instructions; and
a processor configured to execute the one or more instructions stored in the memory to:
control a display to display content received from a server through the communication interface, the content including an original image of a size greater than a screen size of the display,
obtain a control signal corresponding to a user input indicating a directional command for controlling the content displayed on the display, and transmit the obtained control signal to the server through the communication interface;
before receiving the content processed by the server, process, locally, the content by identifying a cropping area within the original image based on the received user input wherein the cropping area is shifted in a direction corresponding to the directional command
control the display to display an image corresponding to the cropping area of the original image on the display;
receive the content processed by the server based on the transmitted obtained control signal from the server through the communication interface, and control the display to display the received processed content.

2. The electronic apparatus of claim 1, wherein the processor is configured to execute the one or more instructions stored in the memory to:
shift the cropping area to be output to the screen of the display in one of left, right, upward, and downward directions in original image data, in accordance with the obtained control signal corresponding to the user input being one of left, right, upward, and downward direction key inputs, and
control the display to display image data extracted from the shifted cropping area.

3. The electronic apparatus of claim 1, wherein the processor is configured to execute the one or more instructions stored in the memory to:
reduce or enlarge the cropping area to be output to the screen of the display, in original image data, in accordance with the obtained control signal corresponding to the user input being one of forward and backward key inputs, and
control the display to display image data extracted from the reduced or enlarged cropping area.

4. The electronic apparatus of claim 1, further comprising:
a database storing image output control signals mapped respectively in correspondence with control signals corresponding to one or more user inputs,
wherein the processor is configured to execute the one or more instructions stored in the memory to obtain an image output control signal corresponding to the obtained control signal corresponding to the user input by referring to the database.

5. The electronic apparatus of claim 1, wherein the content received from the server further includes audio data, and
the processor is configured to execute the one or more instructions stored in the memory to:
obtain an audio output control signal corresponding to the obtained control signal corresponding to the user input,
process the audio data received from the server, based on the obtained audio output control signal, and
control an audio outputter to output the processed audio data.

6. The electronic apparatus of claim 5, further comprising:

a database storing audio output control signals mapped respectively in correspondence with control signals corresponding to one or more user inputs, wherein the processor is configured to execute the one or more instructions stored in the memory to obtain the audio output control signal corresponding to the obtained control signal corresponding to the user input by referring to the database.

7. The electronic apparatus of claim 5, wherein the audio output control signal includes an effect sound control signal, and the processor is configured to execute the one or more instructions stored in the memory to:

obtain the effect sound control signal corresponding to the obtained control signal corresponding to the user input, process an effect sound, based on the obtained effect sound control signal, and control the audio outputter to mix and output the audio data received from the server and the processed effect sound.

8. The electronic apparatus of claim 5, wherein the audio output control signal includes an audio parameter control signal, and the processor is configured to execute the one or more instructions stored in the memory to:

obtain the audio parameter control signal corresponding to the obtained control signal corresponding to the user input, and adjust the audio data received from the server according to the obtained audio parameter control signal and control the audio outputter to output the adjusted audio data.

9. A method of operating an electronic apparatus, the method comprising:

displaying, on a display, content received from a server, the content including an original image of a size greater than a screen size of the display;

obtaining a control signal corresponding to a user input indicating a directional command for controlling the content displayed on the display, and the obtained control signal to the server;

before receiving content processed by the server, processing, locally, the content by identifying a cropping area within the original image based on the user input, wherein the cropping area is shifted in a direction corresponding to the directional command; displaying an image corresponding to the cropping area of the original image on the display;

receiving the content processed by the server based on the transmitted obtained control signal from the server, and controlling the display to display the received processed content.

10. The method of claim 9, further comprising:

shifting the cropping area to be output to the screen of the display in one of left, right, upward, and downward directions in original image data, in accordance with the obtained control signal corresponding to the user input being one of left, right, upward, and downward direction key inputs; and controlling the display to display image data extracted from the shifted cropping area.

11. The method of claim 9, further comprising:

reducing or enlarging the cropping area to be output to the screen of the display, in original image data, in accordance with the obtained control signal corresponding to the user input being one of forward and backward key inputs; and controlling the display to display image data extracted from the reduced or enlarged cropping area.

12. The method of claim 9, wherein the electronic apparatus includes a database storing image output control signals mapped respectively in correspondence with control signals corresponding to one or more user inputs, and the method further comprises:

obtaining the image output control signal corresponding to the obtained control signal corresponding to the user input by referring to the database.

13. The method of claim 9, wherein the content received from the server further comprises audio data, and the method further comprises:

obtaining an audio output control signal corresponding to the obtained control signal corresponding to the user input, processing the audio data received from the server, based on the obtained audio output control signal, and outputting the processed audio data.

14. The method of claim 13, wherein the electronic apparatus includes a database storing audio output control signals mapped respectively in correspondence with control signals corresponding to one or more user inputs, and the method further comprises:

obtaining the audio output control signal corresponding to the obtained control signal corresponding to the user input by referring to the database.

15. The method of claim 14, wherein the audio output control signal includes an effect sound control signal, and the method further comprises:

obtaining the effect sound control signal corresponding to the obtained control signal corresponding to the user input, processing an effect sound based on the obtained effect sound control signal, and mixing and outputting the audio data received from the server and the processed effect sound.

16. The method of claim 14, wherein the audio output control signal includes an audio parameter control signal, and the method further comprises:

obtaining the audio parameter control signal corresponding to the obtained control signal corresponding to the user input, and adjusting the audio data received from the server according to the obtained audio parameter control signal and outputting the adjusted audio data.

17. A computer-readable recording medium having recorded thereon one or more programs executable by a processor of an electronic apparatus to implement a method of operating the electronic apparatus, the method comprising:

displaying, on a display, content received from a server, the content including an original image of a size greater than a screen size of the display;

obtaining a control signal corresponding to a user input indicating a directional command for controlling the content displayed on the display, and transmitting the obtained control signal to the server;

before receiving the content processed by the server,
processing, locally, the content by identifying a crop-
ping area within the original image based on the
received user input, wherein the cropping area is
shifted in a direction corresponding to the directional
command; displaying an image corresponding to the
cropping area of the original image on the display;
receiving the content processed by the server based on the
transmitted obtained control signal from the server, and
controlling the display to display the received processed content.

<div align="center">* * * * *</div>